(12) United States Patent
Wagner et al.

(10) Patent No.: US 7,155,586 B1
(45) Date of Patent: Dec. 26, 2006

(54) METHOD OF ALLOWING POINT-IN-TIME VIEW OF DATA ON A DISK USING A MAP ON CACHE DISK

(75) Inventors: Michael Paul Wagner, Raleigh, NC (US); David William Harvey, Newton, MA (US); Alan Lee Taylor, Cary, NC (US); Paul Thomas McGrath, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 328 days.

(21) Appl. No.: 10/748,753

(22) Filed: Dec. 30, 2003

(51) Int. Cl.
*G06F 12/00* (2006.01)
(52) U.S. Cl. ........................ 711/162; 707/204
(58) Field of Classification Search ........ 711/111–114, 711/161–162; 707/200–204; 710/13, 20, 710/23, 54, 61, 65
See application file for complete search history.

(56) References Cited

U.S. PATENT DOCUMENTS

| | | | |
|---|---|---|---|
| 5,623,541 A | 4/1997 | Boyle et al. |
| 5,625,833 A | 4/1997 | Levine et al. |
| 5,687,343 A | 11/1997 | Fecteau et al. |
| 6,035,415 A | 3/2000 | Fleming |
| 6,243,795 B1 | 6/2001 | Yang et al. |
| 6,633,724 B1 | 10/2003 | Hasegawa et al. |
| 6,775,790 B1 | 8/2004 | Reuter et al. |
| 2003/0005248 A1 | 1/2003 | Selkirk et al. |

*Primary Examiner*—Brian R. Peugh
(74) *Attorney, Agent, or Firm*—A. Jose Cortina; R. Kevin Perkins; Daniels Daniels & Verdonik, P.A.

(57) ABSTRACT

A method of creating point-in-time views of data on a disk involves initiating from a host at least one session of writing data to a disk. For each session, an entry is created and stored on an array on the disk. The sessions are assigned unique IDs to each, and provide indications where data for a particular session may be found on the disk.

17 Claims, 12 Drawing Sheets

METHOD OF ALLOWING POINT-IN-TIME VIEW OF DATA ON A DISK USING A MAP ON CACHE DISK

CROSS REFERENCE TO RELATED APPLICATIONS

This application is related to application Ser. No. 10/126,711 entitled "Method of Allowing Point-In-Time View of Data on a Disk" filed Apr. 19, 2002.

FIELD OF THE INVENTION

This invention relates to a method of creating a point-in-time copy of data on a disk, i.e., a Logical Unit (LU), implemented through one or more cache disks which is accessible from a different host. More specifically, the invention allows views of multiple point-in-time copies in by loading a portion of a map, and have that portion of the map loaded provide complete information of the processing, input and output, i.e., I/O, without requiring loading of the entire map for the entire source LU before any I/O can be processed.

BACKGROUND OF THE INVENTION

In conventional storage environments or systems, such as block storage systems, it is often the case that such environments or systems will include one or more hosts, such as a server, for example, such as is available from Sun Microsystems and/or other companies. Such hosts are typically attached through network connections, such as a fibre channel, to one or more storage units or arrays. Such storage units or arrays are typically configured as a cabinet including multiple storage disk drives, and onboard intelligence in the form of one or more processors which operate to control the storage unit. Examples of such storage units are those available from EMC Corporation, for example, under the product name Clariion™.

In such environments, multiple input-output (I/O) operations occur due to users working through one or more hosts to read and write data to disks in the storage unit.

A session is a window of time during which read and write operations are conducted in a manner protecting the data existing at the start of the session. For example, a session might involve storing of ticket purchase orders for a concert or other event which occurred beginning at 9:00 a.m. on a Tuesday, and ending at 1:00 p.m. on the same day.

For general backup processing, it is desirable to be able to view all the data for a particular session from a separate host, for example, to support offloading of the backup processing from the host processing the application. However, it becomes difficult to track the data because subsequent sessions by the host which initiated the first session will often change the configuration of the disk, and the way data is stored thereon in a manner such that it becomes impossible to view and access data for a prior session.

One prior product available from EMC Corporation under the aforementioned Clariion™ name currently supports the ability to view data for a single active session on a disk. Although such a device supports a single session, it is often the case that a host would want to run multiple sessions concurrently. For example, in the aforementioned example concerning ticket sales, the first session may have started at 9:00 a.m., but a user at the host also knows that tickets for a particular and very popular event are due to begin sales at 10:00 a.m. In such a case, it is desirable to run a second session while continuing to run the first session for sales of all tickets from 9:00 a.m. to 1:00 p.m. so as to be able to gather information about which ticket sales were directly attributable to the popular event, and sales for which began at 10:00 a.m. That system is incapable of allowing views of multiple sessions. Further, in the event of failure such as the loss of power, etc., the session data will be lost and the session must be manually restarted when the failure has been corrected.

SUMMARY OF THE INVENTION

In accordance with one aspect of the invention, the problem of current systems which support only a single session, and are not able to provide protection against a single point of failure, e.g., SP crash, power failure, etc. are avoided.

In a recent improvement, as discussed in the above-referenced application Ser. No. 10/126,711 entitled "Method of Allowing Point-In-Time View of Data on a Disk" filed Apr. 19, 2002, there is described a method of allowing point-in-time views of data on a disk, where a first session is initiated. A map entry is created and stored, which contains a session bit, indicative of which portion of the disk for the first session was affected by a write operation, and where data corresponding to the first session is stored on the disk. A second session is initiated at a time different from the initiation of this first session, and the second session also affects a portion of the disk. The data on any portion of the disk, for example, data corresponding to the first session, which is to be affected by a write operation corresponding to the second session, is copied, and there is created and stored a map entry, which contains a session bit, indicative of where the data which has been copied corresponding to the first session, resides. Through access to the bits which have been created and stored, a second host can then access the data corresponding to the various sessions, because through use of the session bits, the second host then knows where the data corresponding for each session resides on disk.

In that system and method, the bits are stored in volatile memory such as random access memory (RAM). In a more specific implementation, a second copy is made in persistent storage, for example in a dedicated portion of the disk constituting a map, such that, for example, in the event of a power failure, while the session bit may be lost in RAM, it can be recreated by copying from the corresponding entry in the dedicated portion of the disk, i.e., persistent storage. This implementation where the session bits are also stored in persistent storage can be used in support of multiple sessions as described herein, or, for example, with the prior art system which supports only single sessions, and wherein that single session can be recovered even in the event of a failure such as a power failure.

In that system, it was found that it is often the case that when a second host needs to access session data for one or more sessions, under certain operating environments, the host must first initiate a write operation. If that write operation occurs, then session data which the second host wishes to access may be affected. To avoid these problems, a duplicate entry, i.e., a session bit for a particular session, is made and the data for that session is also copied to allow the host to perform its write operation and view the session data without affecting the original stored session data. The host can then perform whatever backup operations are required, terminate the operations, and the original data for one or more sessions remains unaffected.

However, in this system an entire map was required to be loaded in volatile memory before a session could be viewed.

In a yet still further improvement to the system of application Ser. No. 10/126,711, and as more further described herein, the requirement of having to load an entire map is avoided. More specifically, in accordance with a more specific implementation, when a session is initiated, entries are created and stored in an array on a disk (cache disk). The entries identify where the data written to the disk is located. This is done for each session. Preferably a session sequence number is assigned to a session when a session is initiated. As I/O operations are processed, the session sequence number is stored in a chunk allocation block. If the session is terminated, the chunks allocation block can be cleansed of the previous session.

In a more specific aspect, the sessions are assigned specific slots in the array. When a new session corresponding to a prior session is started, e.g., a new Monday session, it is assigned to the same slot as the prior Monday but with a new session sequence number. The array is preferably a direct linear map pointing to the sections on the side where data is located for each session.

BRIEF DESCRIPTION OF THE DRAWINGS

Having thus briefly described the invention, the same will become better understood from the appended drawings, wherein.

DETAILED DISCUSSION

Figure 2:
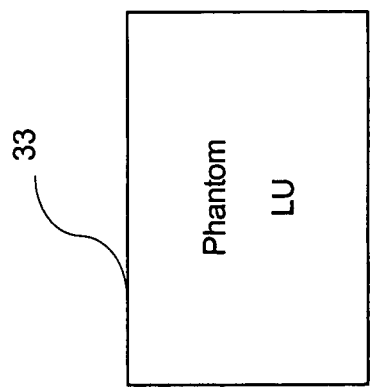
FIG. 2 is a block diagram illustrating a portion of FIG. 1 as a phantom Logical Unit in which session bits are used to determine which data to present.

To facilitate understanding of this invention, the following terms are set forth as defined terms, which will then facilitate an understanding of the method described herein.

Chunk Allocation Region: A Chunk Allocation Region is a Region on a Cache LU that records information about the allocation and state of a Chunk being used to hold a copy of the User Data for a Source LU Chunks. This region includes an "In Use Bitmap" where a bit is set if a Chunk has been allocated for use as a repository, and an "In Cache Bitmap" where a bit is set if the User Data has actually been copied to the Cache LU Chunk.

Chunk: For convenience sake, a Source LU, and portions of a Cache LU, are divided into 64 K Chunks. The Source LU is manipulated as a large array of Chunks, starting at Chunk 0, and ending at Chunk n, where n is the size of the Source LU in bytes, divided by 64 K.

Chunk Map Entry: This refers to a structure used to indicate what chunks have had COFW operations performed. These entries are stored in a hash table for fast lookup. Their existence indicates that a COFW operation has occurred and there is data in the View Cache.

Chunk Size: This is the unit of measure used to improve performance. Instead of storing individual blocks in the View Cache and keeping internal management information about each individual block, an operating system driver will use multiple blocks (Chunk Size). All COFW (defined below) I/O is done in Chunk Sized I/Os. The default Chunk Size is 64 KB and is user configurable in selectable sizes of 16 KB, 32 KB, 64 KB, 128 KB, and 256 KB.

Direct Linear Map: The Direct Linear Map is an implementation of the Snap Map. As set forth herein, the Snap Map is an association between a (Source LU Chunk, Session) and a (Cache LU Chunk). The Direct Linear Map is an array laid out as a series of "slots", where an invalid value indicates that there is no Cache LU Chunk associated with the (Source LU Chunk, Session), and a valid value indicates the existence of an association.

Copy on First Write (COFW): This is an implementation that ensures the original version of Source LU data is saved before being modified. Before the first modification, and after the start of a View Session, the original data on the Source LU will be read and stored in the View Cache. This only applies to the first modification of the data. Overwrite of any data that has already had a COFW does not require any extra processing since the original data was previously saved in the View Cache.

Gaggle: This is a structure used to combine cache device usage and Chunk Map Entries so that memory usage and flushing of persistent information is as optimal as possible. Conventional definitions define a gaggle as a "flock of geese." In usage herein it symbolizes a "flock of chunk entries."

Region: The meta-data on a Cache LU is organized as a series of 64 K Regions, manipulated by the VM Region Manager. The meta-data on a Cache LU contains a set of Direct Linear Map Regions and/or a set of Chunk Allocation Regions.

Logical Unit: A Logical Unit is one or more disk modules bound into a single entity, accessible by Logical Unit number, a hexadecimal number that becomes part of the disk unit device name.

Session LU and Snap LU: A phantom Logical Unit associated with a Source LU. The Session LU or Snap LU is created (not bound like a traditional LU) via, for example, through programming of the array, for the purpose of accessing a session of a Source LU from a connected host. The Session LU or Snap LU appears "off-line" until a session is started on the associated Source LU and activated on the Session LU.

Source LU: The LU of which a point in time "frozen snapshot" view is being taken. This would characteristically be a database, or other user production data, accessed by a production (non-backup) host. Typically the data on the Source LU would be constantly changing. The data on the Source LU is the data of which a user wants to preserve a view from a previous point in time. The Source LU is the LU that contains real user data and has an associated Session LU defined for it.

Source Logical Unit: A Logical Unit (LU) is one or more disk modules bound into a single entity. An LU is accessible to connected hosts by a Logical Unit number, a hexadecimal number that becomes part of the disk unit device name. A Source LU is an LU that contains real user data and has an associated Session LU defined for it.

Snap Map: A correspondence from a Source LU "Chunk" and Session to a Cache LU area that contains the copy of the Source LU data at the time the Session was started. For example, a Snap Map might say, the Cache LU Chunk number 666 contains a copy of the data from Source LU Chunk 950 for the Session that started on Monday at 9:00 AM. The Snap Map is updated when a Source LU Chunk is modified for the first time after a Session is started (Copy On First Write—COFW), or when a host writes to a SnapShot LU. The Snap Map is read through the SnapShot LU, when a host wishes to access the frozen in time view of user data preserved by a Session.

View Cache: This refers to disk storage used to hold the original data from a Source LU that has been modified since the start of a View Session. This storage is pre-allocated and used exclusively for such purposes. The View Cache can consist of multiple Logical Units; the Logical Units are then managed as a pool of space. For each storage processor, this feature allows independent, different sized, View Caches to be defined.

View Session: A View Session starts when a snapshot is taken (not when the snapshot is created through the program) of a Source LU. A snapshot can be taken through programming on the storage array. A View Session can be scripted from a host. The View Session can be stopped in a similar manner when the Session LU is no longer of any use. There is only one active session on a Session LU at any given time. There can be many concurrent active sessions, on different Session LUs, bound by the array memory resources allotted to the feature.

Figure 1:
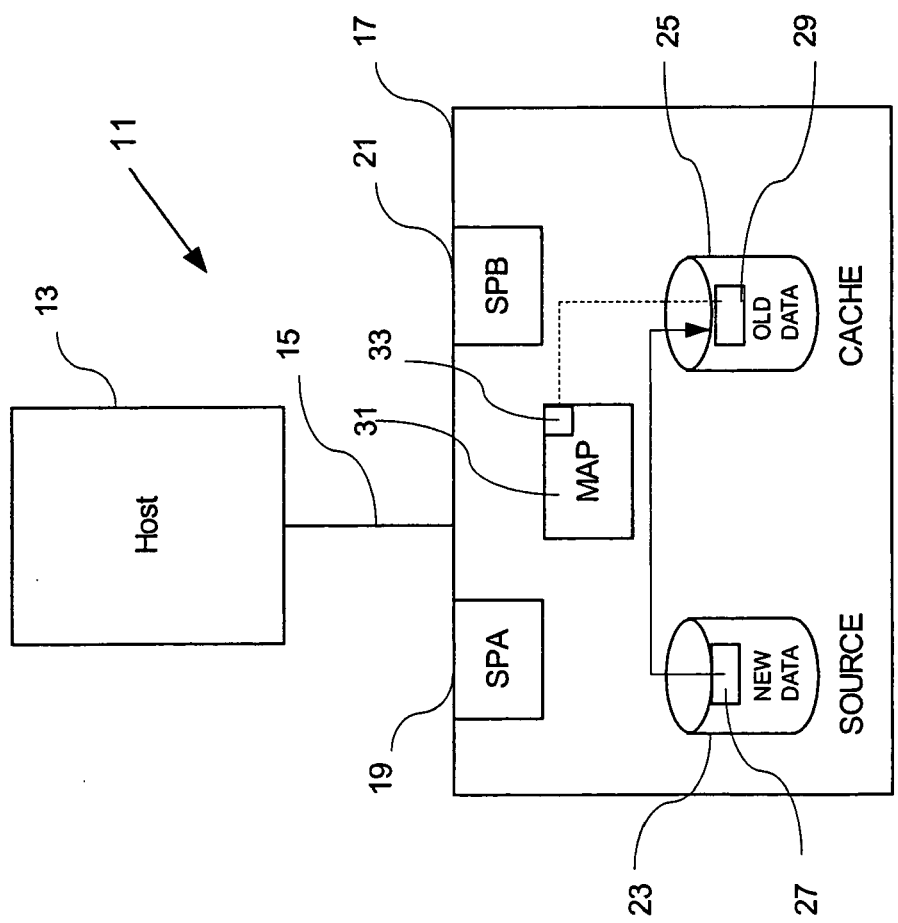
FIG. 1 is a block diagram illustrating a host attached through a fibre channel switch to a storage array, having multiple disks contained therein.

FIG. 1 illustrates a typical arrangement in which a host 13 is connected in a network 11 through a fibre channel connection 15, to a storage array unit 17 having storage processors 19 and 21 and at least two storage disks 23 and 25. A map 31 of where data resides is also stored, for example, in memory such as Random Access Memory. The map includes chunk map entry 33 which include, as illustrated in FIG. 2, phantom Logical Units (LUs) as well as other data/bits mapping COFW data from disk 23 to disk 25.

As illustrated, a session may be initiated by a host 13 and new data 27 is entered into a source disk 23. Prior to new data 27 being entered for a session which would affect old data, the old data is copied over to a cache disk 25 and a session bit is set at this chunk map entry 33 with a pointer to where the old data 29 for the session resides in the cache disk 25.

Figure 3:
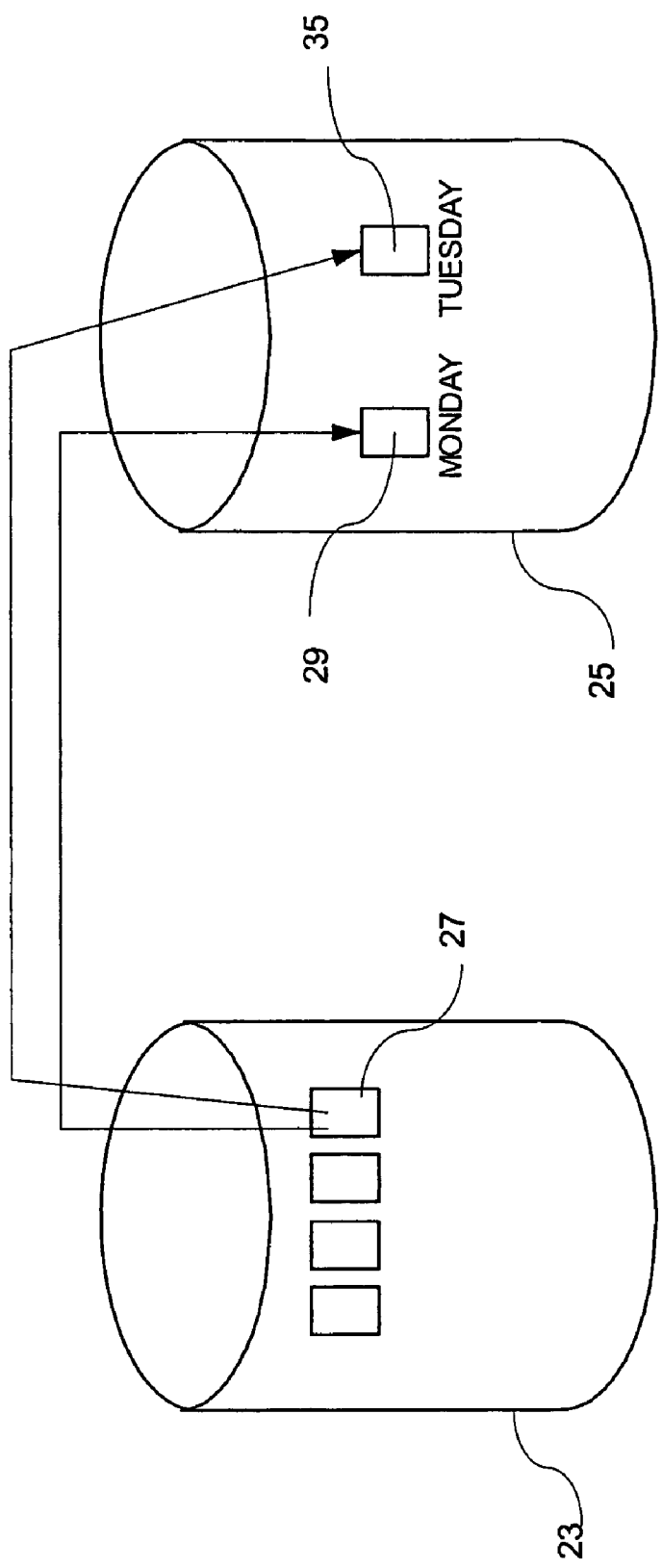
FIG. 3 is a block diagram illustrating how multiple sessions are stored on a cache disk from a source disk as sessions are accessed by a host.

As illustrated in FIG. 3, the method described herein supports multiple sessions, thus, as new data 27 is to be entered, old data, for example for two sessions, is copied over into two different regions of the cache disk 25, for example, a first region 29 for Monday data, and a second region 35 for Tuesday data so that that data can be preserved and viewed, for example, for two sessions, is copied over into two different regions of the cache disk 25, for example, a first region 29 for Monday data, and a second region 35 for Tuesday data so that that data can be preserved and viewed, for example through a second host performing backend processing.

Session bit usage can optimize cases where data was not modified during the "Monday" session but does get modified after the "Tuesday" session has been created. In this case a single copy of the data is stored in the View Cache and a single chunk map entry is created that contains session bits indicating that for either the "Monday" or "Tuesday" sessions, this data is in one place. This is illustrated in the discussion hereafter.

Figure 4:
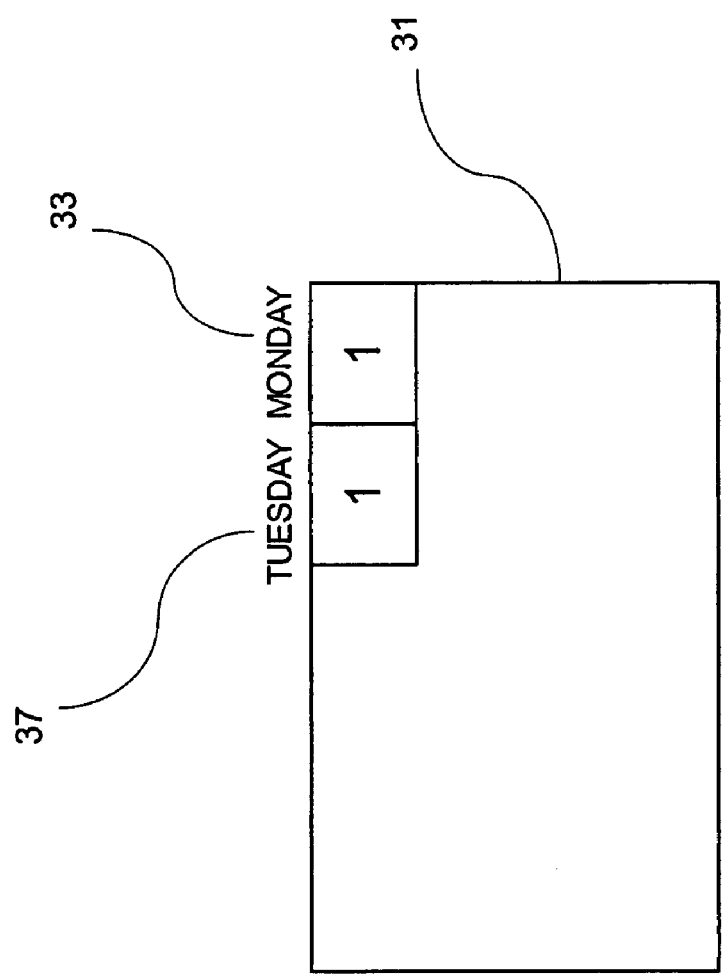
FIG. 4 illustrates a Logical Unit illustrating how session bits are set for different sessions so that multiple sessions can be accessed by a second host.

FIG. 4 illustrates a chunk map 31 in which two areas are reserved for setting session bits for the different sessions. For example, the chunk map entry containing session bit 33 can be set for Monday pointing to where in the cache disk the old data for the Monday session resides, and the chunk map entry containing session bit 37 can be set to point to where in the cache disk the session data for the Tuesday session resides.

Figure 5:
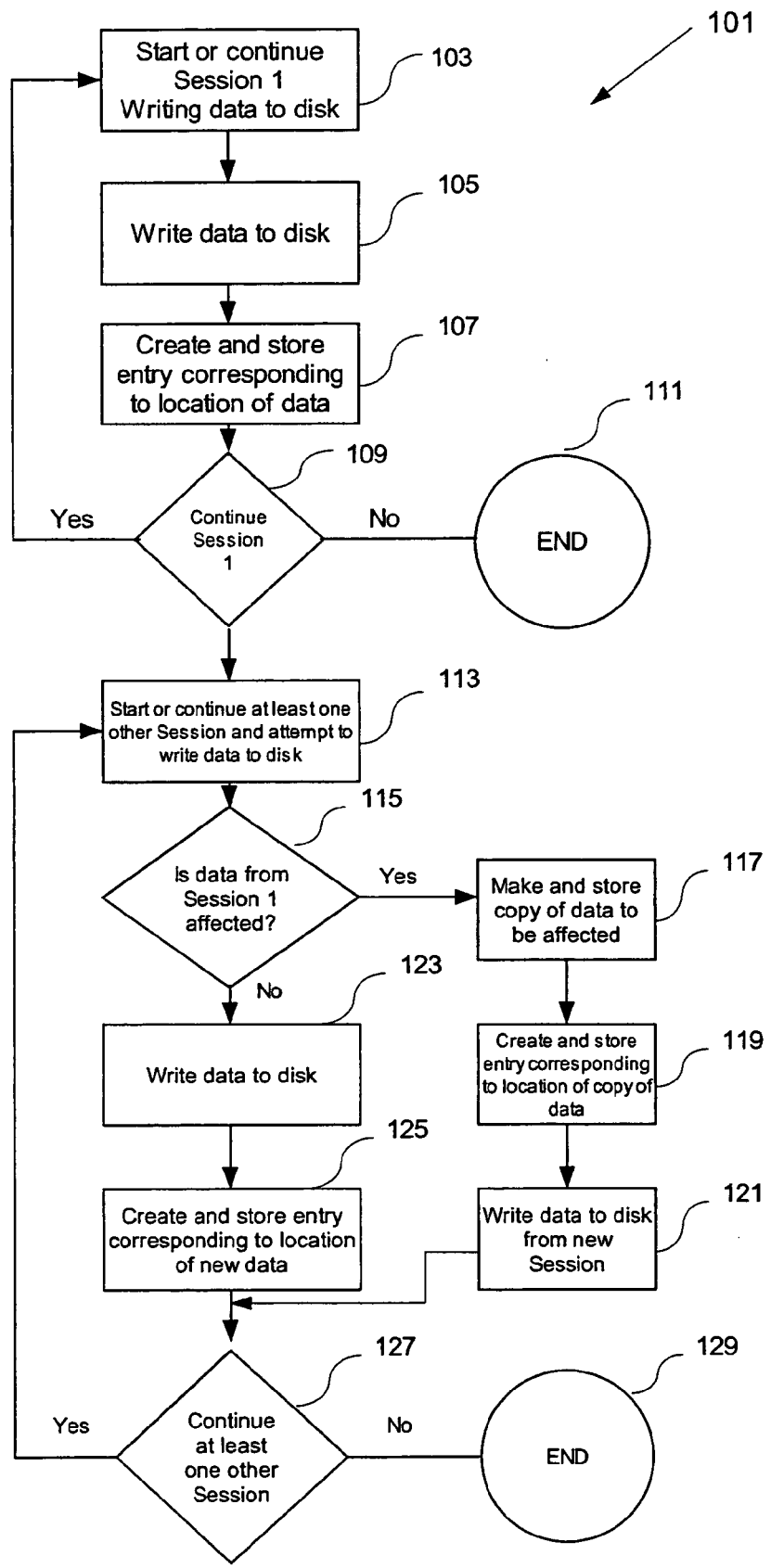
FIG. 5 is a flow chart illustrating the operation of how multiple sessions can be stored and access to multiple sessions by a second host maintained.

To further describe the operation, FIG. 5 is a flow chart 101 which shows how multiple sessions are supported.

An initial session is started at step 103 where data is written to disk, for example, source disk 23. At step 105 the request is analyzed to determine how many chunks are affected and how many we have already processed. At step 107 we look to see if we have processed all of the chunks affected, if so we go to step 113 and write the original data to the source LU. If we have not processed all of the chunks we move to step 109 where we create the chunk map entry with the correct session bits set and perform the COFW operations, copying the old data from the source LU to the cache disk 25. We then return to step 105 to reevaluate the work left to do.

Figure 6:
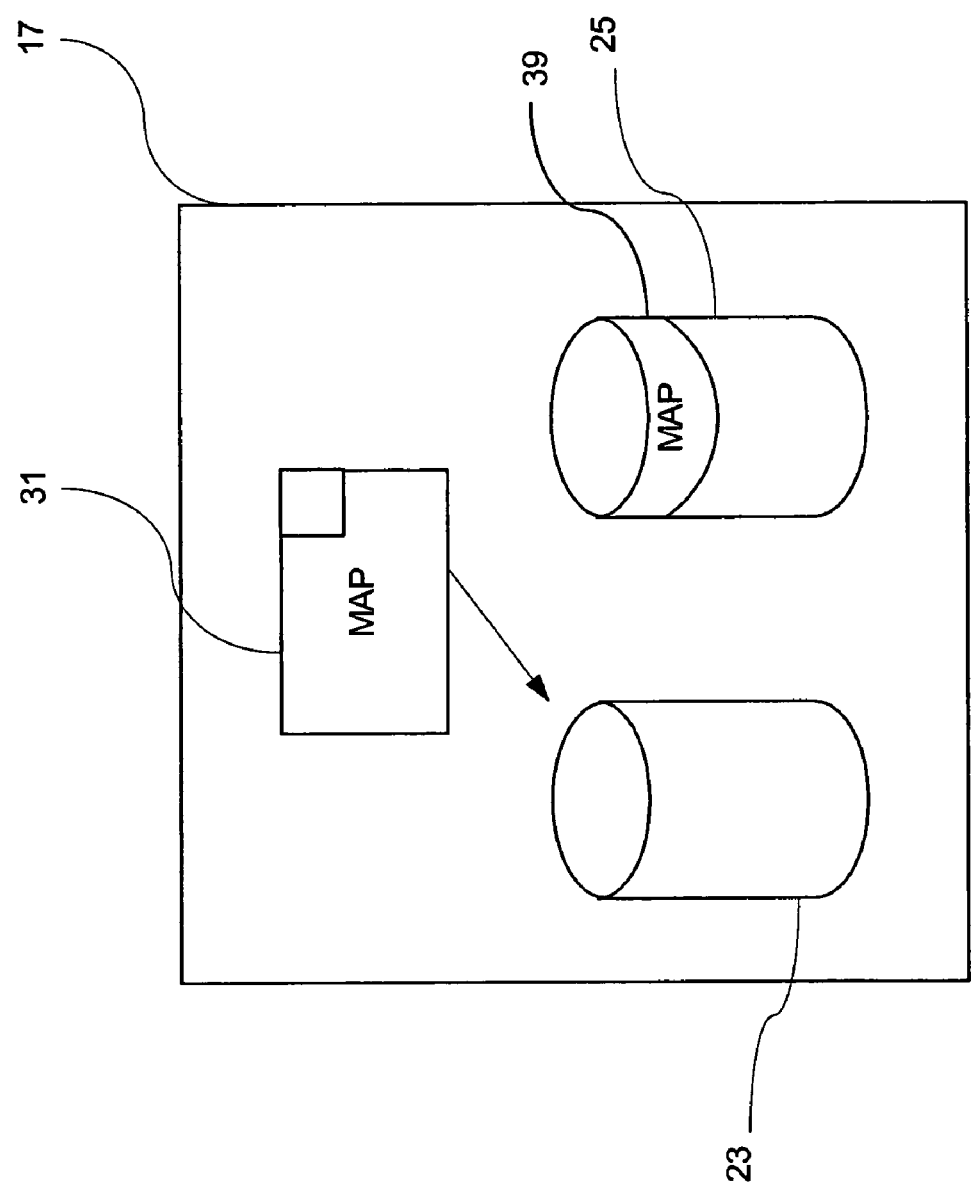
FIG. 6 is a block diagram illustrating how a portion of a disk is reserved for purposes of maintaining a copy of session bits so that in the event of a failure, access to the sessions can be recovered without having to manually restart the system.

FIG. 6 illustrates how the data can be made persistent. By the term "persistent" is meant that access to the data can be automatically recovered after a failure such as a power failure, processor failure, etc. More specifically, in the event of a storage processor failure or rebooting, an array failure or reboot, or a host I/O trespass from one storage processor to the other, it is possible that the chunk map entry or session bits corresponding to the data, particularly old data for a session may be lost. The reason for this is because the session bits are typically stored in volatile memory such as RAM. As illustrated in FIG. 6, it is possible to make the sessions persistent without requiring manual restarting of the session by reserving a portion 39 of the cache disk 25 in which a copy of each session bit is made for particular sessions. In such a case, it is possible to make the sessions persistent.

More specifically, when sessions terminate as a result of one of the previously-mentioned conditions, all COFW information is lost, thus causing the point-in-time view of the data to be lost. Thus, by reserving a portion 39 of a disk, it is possible to know what data has already had COFW done for a session, and where in the cache disk 25 the data resides. Thus, at the time a session is started, the cache device will be assigned to the Source LU for the purposes of persistently storing map entries associated with any COFWs that have occurred in any of the persistent sessions on the Source LU.

In accordance with the invention, decisions about whether all sessions are made persistent can be made depending on resource allocation and not all sessions need to be made persistent and thus, the amount of storage area reserved for the map 39 can be most effectively manipulated.

Thus in a specific implementation, a user can send a start session command indicating that the session data is to be made persistent. The device driver looks for a cache device that is not in use and if it does not find one, returns an error. If a cache device is found, it assigns it to the Source LU that the session is being started on. The driver using the current Chunk Size value computes how much COFW data can reside on the cache device and then determines how many Gaggles are required to manage the COFW space. At this point, the cache device is initialized with information indicating there is a session started and that there are no active Gaggles. This will result in the flushing of the cache map header to the cache device. At this point, the offset where COFW data can be written to is established and the session is ready for COFW processing.

The basic methodology for processing persistent COFW operation is as follows:

The write request is analyzed to determine what if any COFW processing needs to be done for the request. If there is none required, the request is passed on. For each new COFW operation, a Chunk Map Entry is performed. Available chunks are found in Gaggles mapped to memory. If this succeeds, the Gaggles are flushed to the cache device. COFW processing then continues in a conventional manner, and when the COFW data is written to the cache device, the Chunk Map Entry is updated and the Gaggle the Chunk Map Entry resides in is flushed to the cache device. When the last COFW operation is complete, the original write is passed on.

In implementing this feature, if there is not enough Gaggle space to assign Chunk Map Entries, it is determined whether another Gaggle can be created for the cache device. If there are already the maximum number of Gaggles for the particular cache device, then a search is conducted for another free cache device to keep the session persistent. Failure to do so terminates the session.

The following table illustrates current COFW operations as compared to persistent COFW I/O operations.

| Current COFW I/O Operations | Persistent COFW I/O Operations |
| --- | --- |
| Read old data<br>Write old data<br>Pass on original write request | Read old data<br>Write old data<br>Write updated Gaggle (Chunk in cache)<br>Pass on original write request |

The following describes how the cache map area is implemented.

The cache map area as shown as 39 in FIG. 6 is the heart of persistence. The cache map area is the area at the beginning of each cache device that has been assigned to a Source LU for the purposes of storing persistent information. The size of this area is calculated based on the size of the cache device, and the current Chunk Size value. Once we know the size of the cache device we can figure out how many chunks can fit on the device. Knowing this allows us to calculate how many Gaggle structures are required to manage the chunks for this cache device. Once this is known we now have the map area and the starting offset to write COFW data.

The cache map area is made up of two structures. The first structure is a SC_GAGGLE_HEADER structure which contains all of the information about sessions that this Source LU is a part of. This structure is always the first one on each cache device.

The SC_GAGGLE_HEADER is 8 kb in size to preserve alignment with the SC_GAGGLE structure defined below. This will allow for all of the current session and cache linkage information to be stored and provide for growth to 16 sessions per device.

The second structure is the SC_GAGGLE. This structure contains the bitmap and Chunk Map Entries for a portion of the cache device. The Gaggle is designed to be 8 kb in size and has the following definition:

```
typedef struct_SC_GAGGLE
{
    //
    // A signature, replicated at the end of the Gaggle to detect Partial Writes.
    // The signatures are incremented together. When reading in a Gaggle, if the two Signatures
    // do not match, we may have a partial Gaggle Write.
    //
    ULONG                                         GaggleSignature;
    //
    // Version of this structure.
    //
    ULONG                                         Version;
    //
    // Link to Gaggle Header Gaggle List
    //
    LIST_ENTRY                                    GagglesListEntry;
    //
    // Used to put Gaggle on various queues during Stop Sessions Processing
    //
    LIST_ENTRY                                    ModifiedGagglesListEntry;
    //
    // Back pointer to the Cache that contains this Gaggle
    //
    struct_SC_CACHE_LIST_ENTRY                    *PCache;
    //
    // Which Gaggle is this?
    //
    ULONG                                         GaggleId;
    //
    // Lock to protect allocation/deallocation of chunks
```

-continued

```
    //
    KSPIN_LOCK                          GaggleLock;
    //
    // A Session Pattern for all Chunk Entries in this Gaggle
    //
    UCHAR                               SessionPattern;
#if defined( ROLLBACK_ON) || 1
    //
    //    padding for future use
    //
    UCHAR                               Padding1;
    UCHAR                               Padding2;
    //
    //    Indicates whether this gaggle is dirty and needs to be written to disk
    //
    BOOLEAN                             NeedsFlushing;
#endif
    //
    // The Chunk Map Entry Warehouse
    //
    K10_MISC_UTIL_MEMORY_WAREHOUSE      ChunkMapEntryWarehouse;
} SC_GAGGLE, *PSC_GAGGLE;
```

The Gaggle plays a very important role in persistence. It is the structure that allows all of the vital information about active Chunk Map Entries on a device to be stored for retrieval in the event a failure occurs that results in the need to move the session to the other storage processor 19 or 21 or continue it after a reboot.

The Gaggle combines two important functions the first is the bitmap of chunks in the cache device. This map is used to determine whether or not there is sufficient space for the COFW data. Combining this with the actual Chunk Map Entries that are assigned to the chunk allows us to update both elements and flush a single request to the cache map area.

Thus as implemented, when a failure occurs when storage processor 19 or 21 is rebooted, attached hosts will attempt to access an alternate path to the array 17. If in fact one SP 19 or 21 is still up this will result in a trespass of the Source LU and its Session LU, then the driver will open the cache devices that are assigned to the Source LU. The trespass will cause a TRESPASS command to come to the device and the driver will begin the process of accessing the cache device to read its gaggle information to determine how to rebuild the map for this source LU. During the recovery process we need to return DEVICE BUSY until the map is rebuilt.

The SC_GAGGLE_HEADER structure will be read in and processed. This consists of setting up any session information in memory and on the local device extension for the sessions active on this Source Lu.

Once this is done, the gaggles will be read and processed. Processing of the gaggles involves figuring out which chunk map entries are valid and part of sessions that are persistent. If the chunk map entry is not a member of a persistent session it will be freed up. A chunk map entry for a non-persistent session ends up in the cache map area because the non persistent sessions still use gaggle space. Therefore if non-persistent session "foo" utilizes chunk entry 6 and then persistent session "bar" comes along and utilizes chunk entry 7, when the persistent session causes this gaggle to be flushed, chunk entry 6 contains valid data but it is for a non persistent session. The rebuild needs to reclaim this space. If any of the sessions for the Source Lu are persistent the gaggle will be flushed to the cache map area. It will only be flushed when modifications to chunk entries in persistent sessions occur, but the gaggle will also contain information about non-persistent chunks.

For those chunks that are in a persistent session, the chunk map entries will be rehashed into the Source Lu's hash table.

While the driver is rebuilding the hash table of chunk map entries, IO requests to the Source Lu and SCLUN(s) will be rejected with device busy status codes.

Having described persistence in detail, further details about the support of multiple sessions are provided hereafter with respect to its specific implementation as already generally described with reference to FIGS. 1–5. More specifically, the method accommodates multiple concurrent sessions on the same Source LU. This functionality allows users to create multiple point in time views of the Source LU. In a user configurable option, it may be desirable, but not mandatory, to allow up to eight concurrent sessions per Source LU. It is important to note here that even though there are allowed up to eight sessions per Source LU, in this implementation, there is typically only 80 MB of memory to manage map entries and thus extensive modifications and multiple sessions could exhaust the budget and cause sessions to terminate.

In an effort to ease the administration of multiple sessions, a user can create a single Session LU and then as needed, decides which session should be presented by this Session LU.

In implementing multiple sessions memory budget is considered and how it would be affected with up to eight active sessions per Source LU. One optimization is implemented with respect to COFW operations that were affecting multiple sessions for the first time. For example, if there were four active sessions and no block in the chunk that contains block 500 was created, and a write to block 500 came in, the Chunk Map Entry was modified for each of the four active sessions because it was a new COFW for the chunk for each session. This consumes 4 times the memory and creates problems with usage counts of the actual COFW data in the cache.

To solve this, in accordance with the invention, a new field is created for Chunk Map Entries that indicates what sessions this entry pertains so. This field is a single character for which the 8 bits are used as indicators of the sessions the chunk is participating in.

The following example will help illustrate how the method can efficiently manage multiple sessions with these new fields.

```
Time 0: no active sessions
    SessionPattern:    0      0      0      0      0      0      0      0
    Sessions:          Null   Null   Null   Null   Null   Null   Null   Null
Time 1: Start session "Foobar"
    SessionPattern:    1      0      0      0      0      0      0      0
    Sessions:          ptr    Null   Null   Null   Null   Null   Null   Null
Time 2: Modify Block 100
    Call to LinearHashRetrievePattern( ) returns            0 0 0 0 0 0 0 0
    We then XOR this value with the current SessionPattern of    1 0 0 0 0 0 0 0
    Result is                                               1 0 0 0 0 0 0 0
    Since result is non zero we know we have to create a chunk entry and assign
    it the resulting pattern
Time 3: Modify Block 1000
    Call to LinearHashRetrievePattern( ) returns            0 0 0 0 0 0 0 0
    We then XOR this value with the current SessionPattern of    1 0 0 0 0 0 0 0
    Result is                                               1 0 0 0 0 0 0 0
    Since result is non zero we know we have to create a chunk entry and assign it
    the resulting pattern
Time 4: Start session "NotAFooBarSession"
    SessionPattern:    1      1      0      0      0      0      0      0
    Sessions:          ptr    ptr    Null   Null   Null   Null   Null   Null
Time 5: Modify Block 100
    Call to LinearHashRetrievePattern( ) return             1 0 0 0 0 0 0 0
    We then XOR this value with the current SessionPattern of    1 1 0 0 0 0 0 0
    Result is                                               0 1 0 0 0 0 0 0
    Since result is non zero we know we have to create a chunk entry and assign it
    the resulting pattern
Time 6: Modify Block 5000
    Call to LinearHashRetrievePatter( ) returns             0 0 0 0 0 0 0 0
    We then XOR this value with the current SessionPattern of    1 1 0 0 0 0 0 0
    Result is                                               1 1 0 0 0 0 0 0
    Since the result is non zero we know we have to create a chunk entry and assign it the resulting
    pattern
Time 7: Modify Block 100
    Call to LinearHashRetrivePattern( ) returns             1 1 0 0 0 0 0 0
    We then XOR this value with the current SessionPattern of    1 1 0 0 0 0 0 0
    Result is                                               0 0 0 0 0 0 0 0
    Since the result is zero we know there are no COFWs to perform
```

When sessions stop the chunk entry with the bit set in the position of the session that is being stopped is found, and the bit is reset to zero. If this results in the SessionPattern being all zeroes, then the chunk entry and associated cache position can be freed up. If the SessionPattern is not all zeroes, then we know that other session(s) are referencing the chunk and the associated COFW data.

Figure 7:
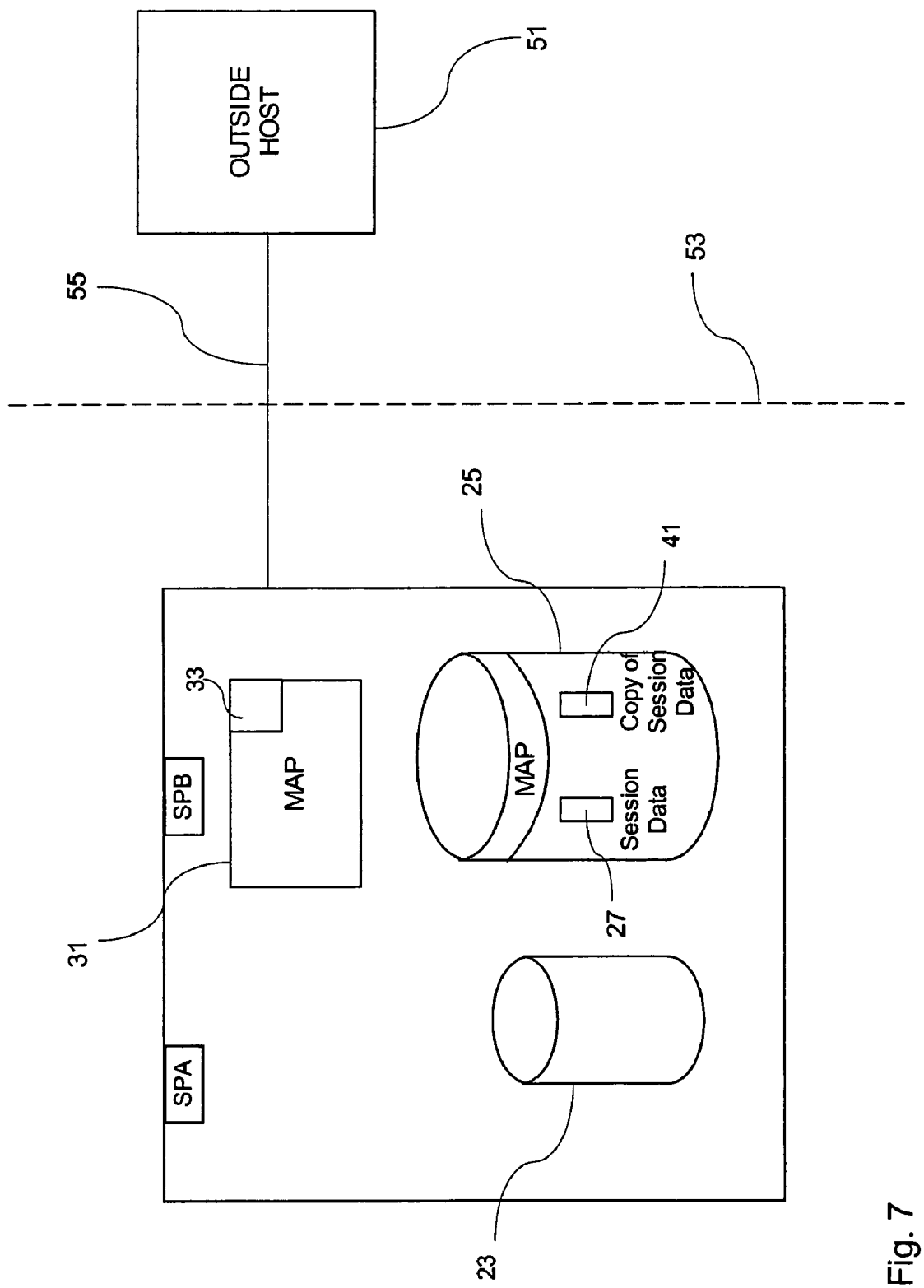
FIG. 7 is a block diagram illustrating how a copy of session data is made to allow a second host to access that data without affecting the original session data for a particular session.

Having thus described persistence and multiple session implementations in greater detail, a yet still further aspect of the method described herein is illustrated in FIG. 7. More specifically, sometimes when a second host 51 wishes to look at a Session LU, certain operating systems require that a write to the disk has to occur. For example, the Windows™ operating system available from Microsoft Corporation requires writing of a signature. So a write operation is required to be granted access. In order to ensure that session data is unaffected by such a write, an outside host 51 writes to the Session LU which causes the driver to created two copies of the chunk affected by the write request. The second copy is marked with a bit indicating it was generated by a write to the Session LU. The users data is then written into the second copy on the cache device. In this manner, the second host 51 is allowed access to session data, and is allowed to work with the session data, and once operations are terminated, the outside host can discontinue all write and read operations and the original session data remains the same and the LU to the copy of the session data disappears.

In a further and more specific implementation, certain additional improvements are described herein. In accordance with this aspect, the afore-mentioned session maps which are included in their entirety in RAM, can be moved to disk so that the process of accessing different sessions can be shortened and sped up. More specifically, in the implementation previously described, the map for an entire source disk, i.e., LU or logical unit, is required to loaded before input/output, i.e. I/O, operations can be conducted. It should be noted that the terms, disk, logical units and LU are used interchangeably herein.

In this specific implementation, a long array is written on cache disk which consists of a long sequence of integers. Each one of the integers identifies a particular location on a cache LU where the data for a particular part of the source LU resides for particular view. For example, there can be a Chunk for a Monday morning session which is the $950^{th}$ Chunk on the source LU, and there would be a copy of that somewhere on the cache LU. The map in the array allows finding the data for that session.

In order to speed up the processing, there must be a way of invalidating, or throwing a view of the session. For example, in accordance with the method of the invention, there may be a session for Monday, Tuesday, Wednesday, Thursday, Friday, Saturday, and Sunday. Each session is given a Unique ID. When Monday comes around again, the view for Monday is to be invalidated and another view begins for Monday, which is given a new ID different from the prior Monday, and which happens to be assigned to the same slot. Everyday, a new view is started, and everyday a user can get to the previous week's view. As the system comes around to the next Monday view, it is assigned the same spot on the disk, but the data better not be the same because the new Monday view will have different data then the previous Monday. Thus, in accordance with the invention, the portions of the Chunk previously used are reused and map entries for the old view are ignored.

The reason for this it that it is not possible to go through the entire disk and mark all old map entries to zero because the array is so large, typically on the order of gigabytes.

FIG. 8 illustrates in greater detail, in a manner similar to FIG. 5, a further improvement in accordance with the invention for speeding up processing. More specifically, FIG. 8 illustrates how multiple sessions can be stored and/or accessed using the direct linear map in accordance with the invention.

Figure 8A:
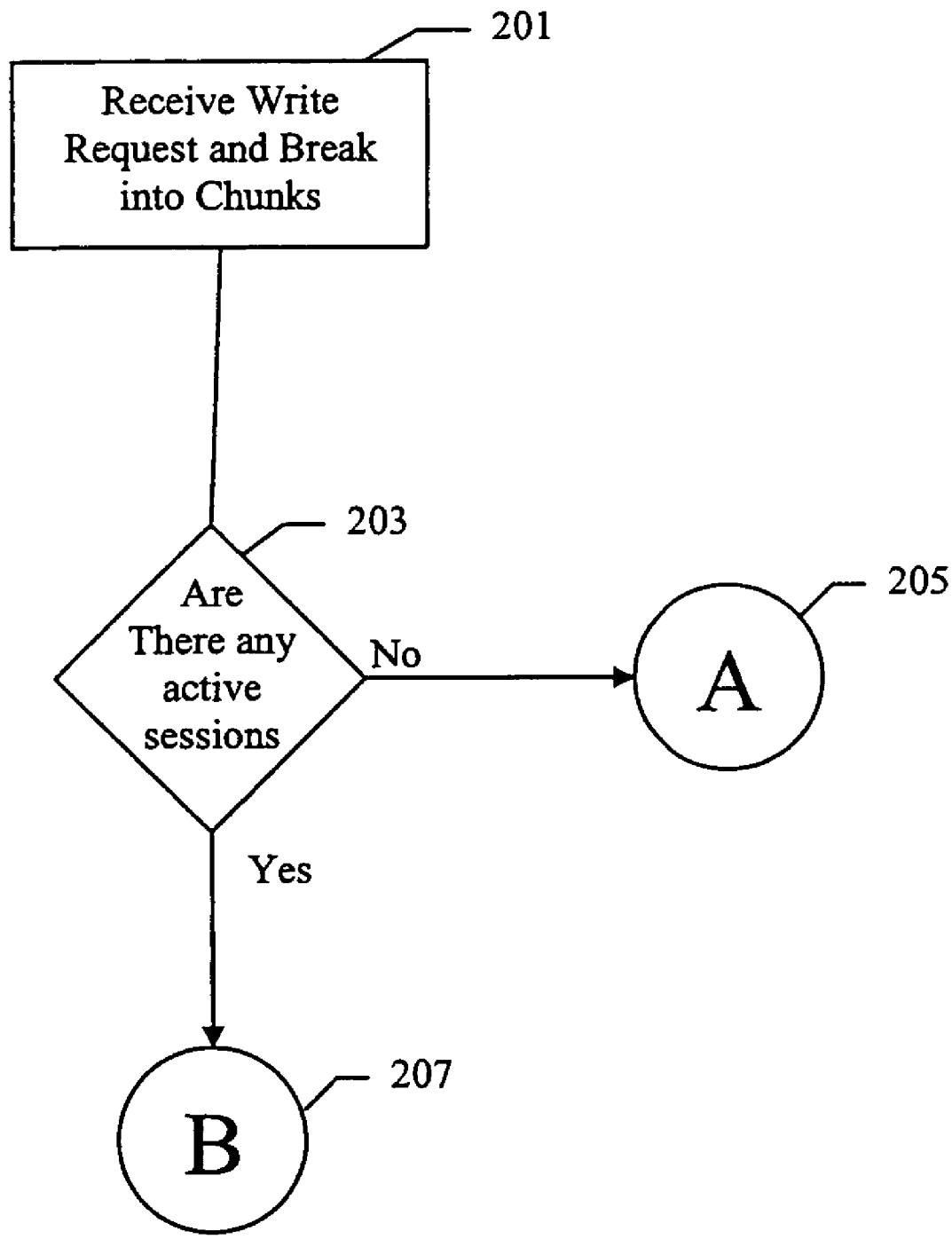
FIG. 8 is a flow chart, similar to that of FIG. 5, and further illustrating how multiple sessions can be stored and/or accessed using the direct linear map in accordance with a further improvement described herein.
Figure 8B:
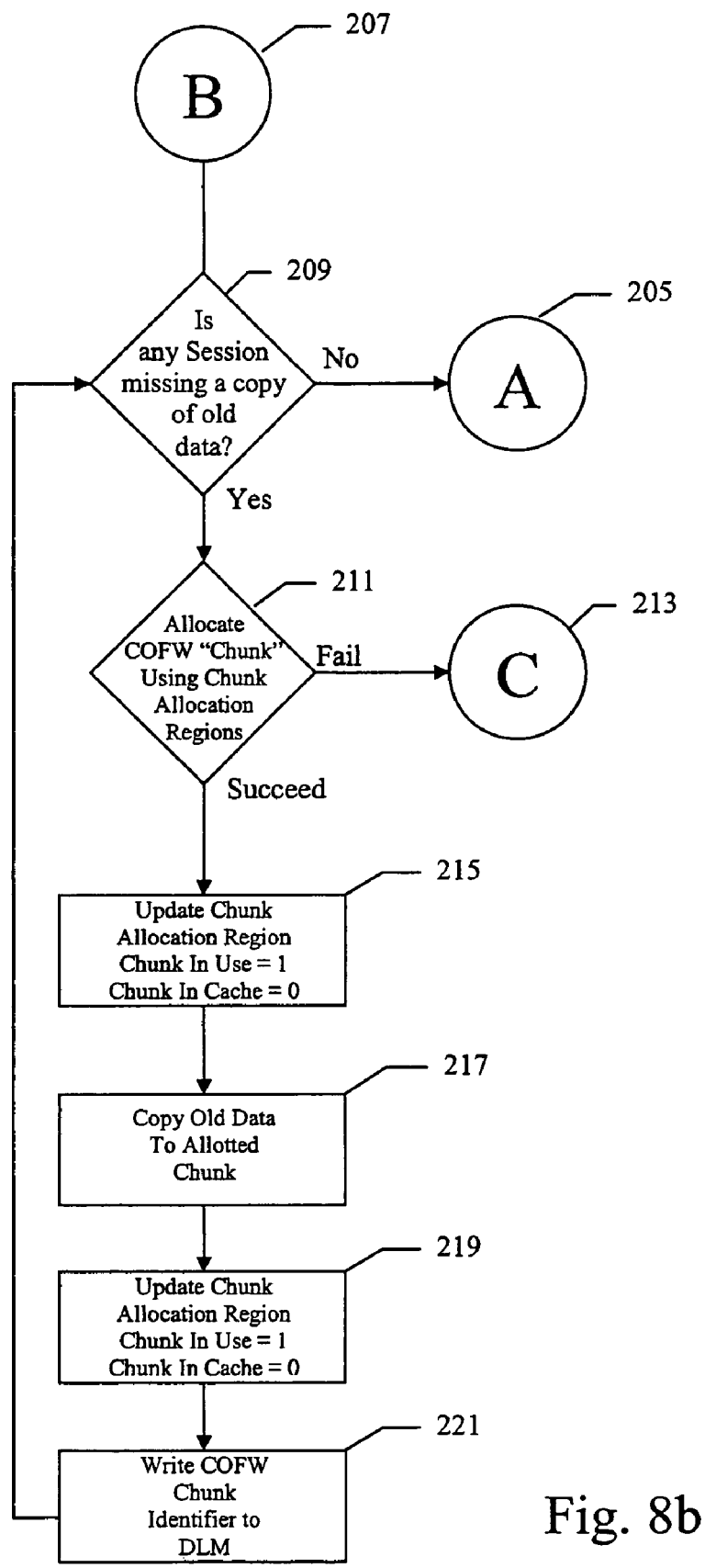

When referring to FIG. 8, it is also appropriate to make reference to FIG. 5 inasmuch as certain steps illustrated in FIG. 8 correspond to certain steps of FIG. 5, but avoids having to write everything to RAM, by the use of the array previously described. In this regard, to facilitate understanding, it is noted that FIG. 8A corresponds to a modification after step 105 in FIG. 5 and the line going to Circle 205 will be equivalent of going to 113 in FIG. 5. FIG. 8B expands on steps 109 and 111 of FIG. 5. With this background, the method as illustrated in FIG. 8 is described further herein.

Figure 8C:
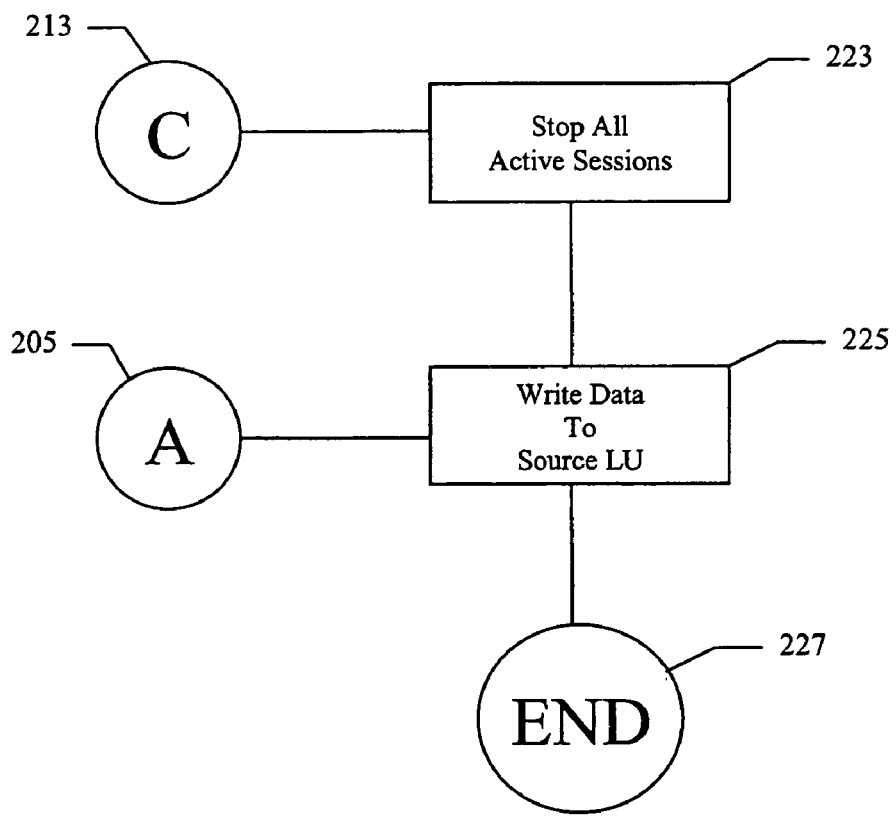

More specifically, at step 201, the write requests are received and broken into chunks. At step 203 an inquiry is made as to whether there are any active sessions. If the answer is no, the method proceeds to Circle 205 as shown in FIG. 8C where at step 225, data is written to the source LU, and the process proceeds to the end at 227. If there answer is yes at step 203, the process proceeds to 207 at FIG. 8B where at step 209 an inquiry is made as to whether there is any session missing a copy of old data. If the answer is no, the process proceeds again to step 205 at FIG. 8C as previously described. If the answer is yes, an attempt is made at step 211 to allocate COFW "chunk" using chunk allocation regions. If this fails, the process proceeds to 213 at FIG. 8C where at step 223 all active sessions are stopped, at step 225 data is written to the source LU, and the process then proceeds to the end at 227. If the allocation succeeds, then at step 215, the chunk allocation region is updated with "chunk in use" set to equal one and "chunk in cache" set to equal zero. At step 217 old data is copied to the allocated chunk. At step 219, the chunk allocation region is updated and "chunk in use" is set to one and "chunk in cache" is set to one. At step 221 the COFW chunk identifier is written to the DLM and then the process repeats itself by returning to step 209.

Figure 9:
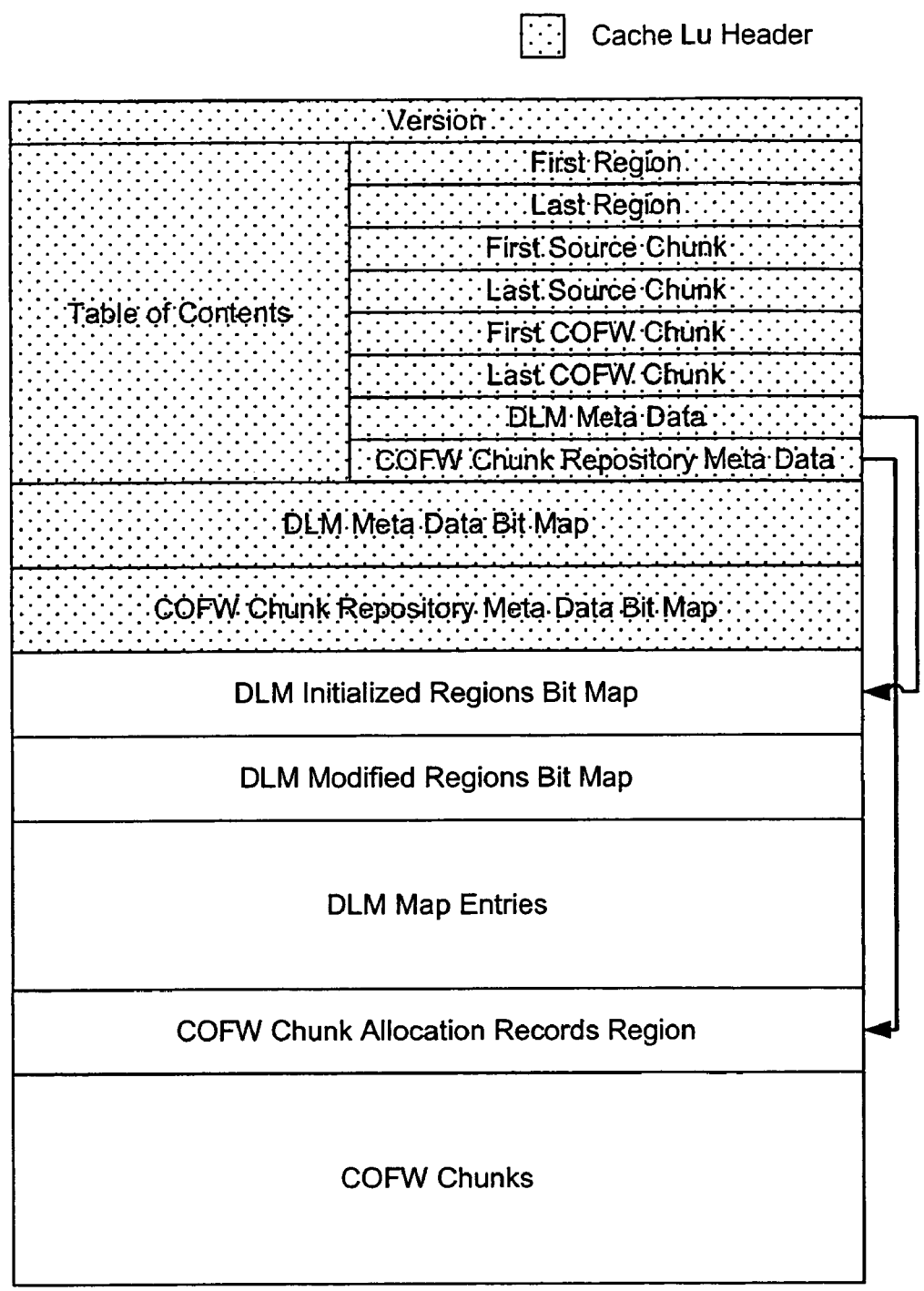
FIG. 9 is a block diagram of a cache LU layout.

FIG. 9 illustrates the layout for a disk which is a cache LU. The cache LU includes a cache LU header which is an index for that particular cache LU. There is also a direct linear map region (DLM) which has what is known as the Chunk Allocation region found on the portion identified as copy of first write (COFW). Thus, the cache LU layout provides a map which points to where data for different sessions may be found on the cache disk or LU.

Figure 10:
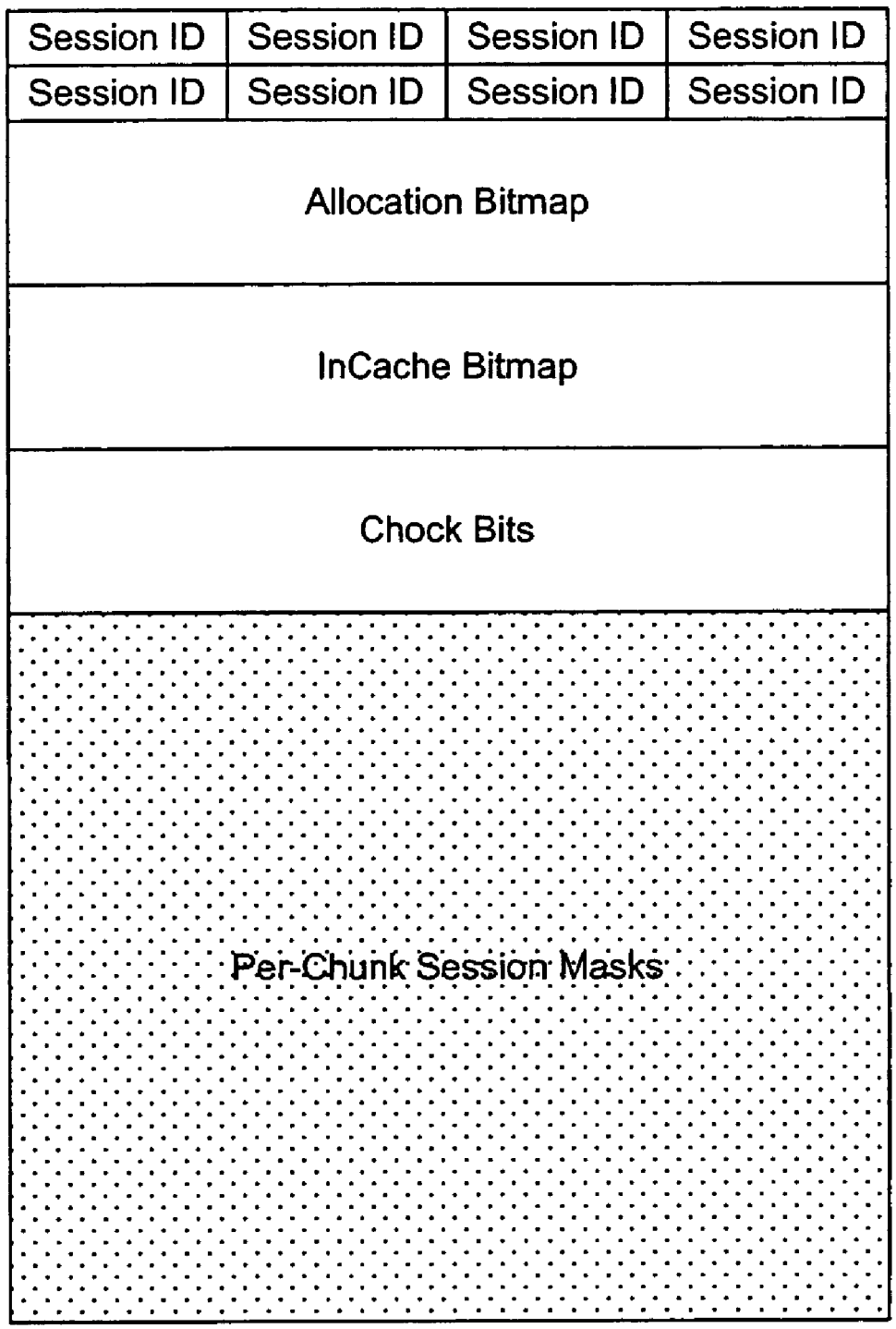
FIG. 10 is a block diagram of a chunk allocation block.

Turning to FIG. 10, there is shown a more detailed view of the Chunk Allocation Region identified as the individual regions known as Chunk Allocation Blocks. The key to the system and this specific improvement is to have an easy way to invalidate the Chunks, for example, by knowing that this portion of the cache disk was used for last Monday's view of the data and not for this Monday's view of the data. In accordance with the invention, session IDs are created. The session ID is a number which is just incremented, and each session is assigned a session ID. Thus, the session ID is a number that increments and corresponds to a specific writing session, for example, like 9 a.m. to noon on a Monday. Thus, in actual implementation, if the first session was last Monday, that session slot is reused and the first session will now have a sequence number that is greater so that even though it is in the first slot, if last Monday the session ID was 666, the following Monday will be the session ID might be 762, but located in the same slot. In this manner, the user knows that he is only interested in Chunks that have a session ID of 762. Thus, even if Chunks from an old session are found in the right place in the map, the numbers don't match and can be ignored.

In a specific implementation, with reference to FIG. 8, the Chunk Allocation Region consists of 128 of the blocks shown in FIG. 9.

The Allocation Bitmap shown in FIG. 9, allows one to determine whether a Chunk map is allocated. More specifically, the bitmap writes a zero or a one. If there is a zero there, it means the block is not allocated. If it is set at a one, then it means the block is allocated. Thus, when looking for the next Chunk to use, the system uses looks for a zero. If a zero is found, then that Chunk is free and can be used.

The InCache Bitmap is used to record the fact that user data has been successfully transferred. More specifically, a piece of the cache LU is allocated, and then the process is started. The copy uses data from that piece of that cache LU. When the data is written, then the bit in the InCache Bitmap is set. If the user finds a Chunk, then the system is reading a chunk allocation block, there is a one found in the allocation bitmap and in the InCache Bitmap. The user then knows that that Chunk is allocated and that valid user data is located there.

The Chock bits are a conventional implementation, and prevents the reading of the cache LU from proceeding backward.

Figure 11:
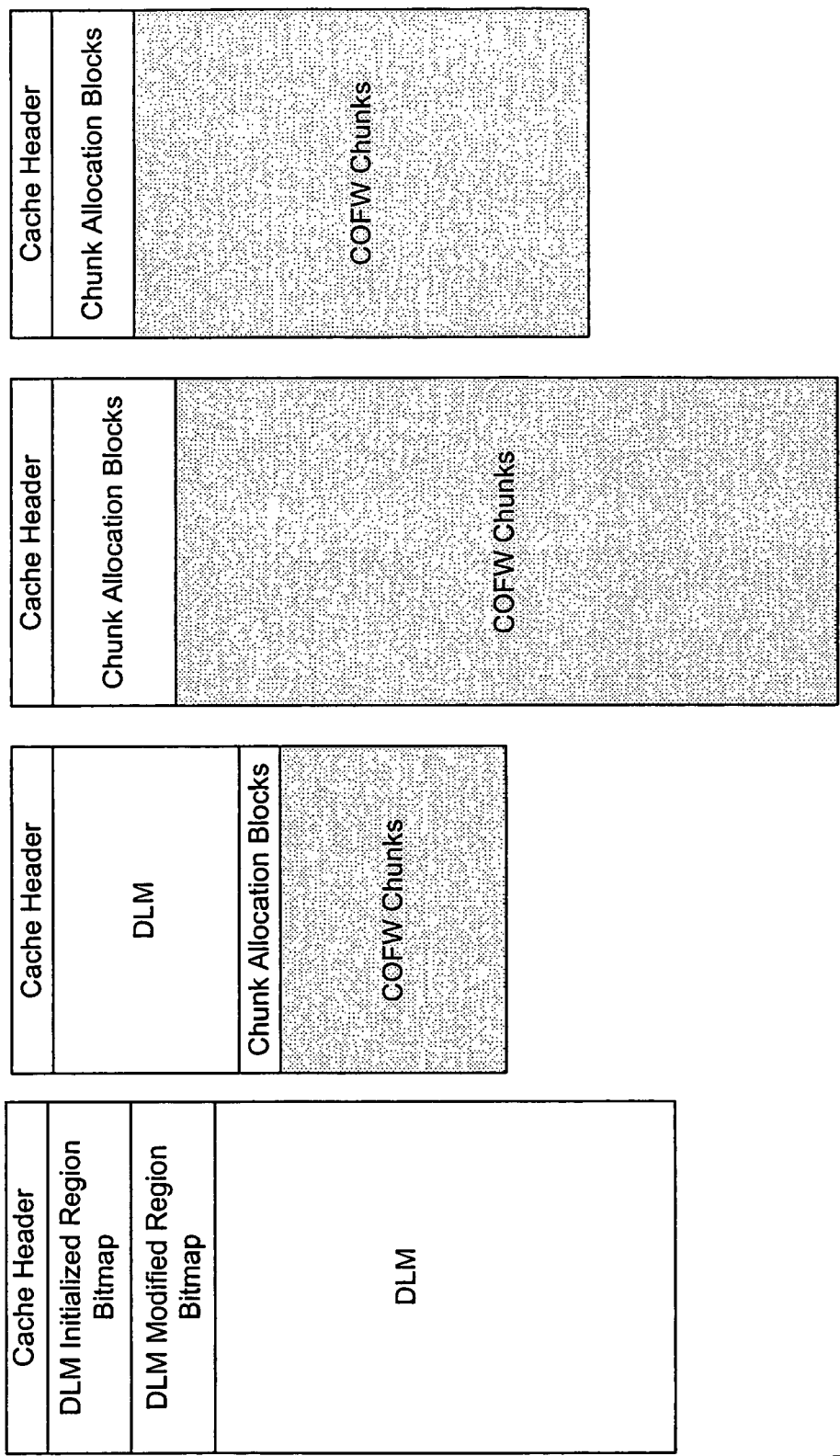
FIG. 11 is a block diagram of a view cache spanning multiple cache logical units.

FIG. 11 illustrates that the direct linear map (DLM) could all be on one cache disk or cache LU, and that there can be copies of Chunks on many other cache LUs. Each block in FIG. 10 identifies a cache LU. The map needs to be either in one place or split across two or more lines and then there is separately created a section of Chunks. Each of the COFW Chunks are mapped by a set of Chunk Allocation Blocks immediately preceding them. In each one of the LUs, the Chunk Allocation Blocks region maps a particular piece of what is called the COFW Chunks. This is a mathematical relationship and will resemble the very first bit in the very first allocation bitmap in the second cache header which maps to the very first Chunk shown in the gray zone of the Figure.

Thus, as an improvement to the aforementioned system, the requirement of reading a long map all at one time into volatile memory is avoided. In accordance with the system described herein, the entire map which consisted of a set of Gaggles, is avoided, and only the information truly required is provided by the direct linear map (DLM).

In accordance with the further improvements set forth here, session IDs allows the systems to proceed without requiring invalidating Chunks, and instead, a new number is merely set for the particular session, in what is typically referred to as a "lazy algorithm."

Having given a broad overview with reference to the drawings of the direct linear map (DLM) aspects of the invention, greater details are provided as follows.

In accordance with the invention, it is important to understand that the direct linear map (DLM) is implemented using four subsections, with different areas of responsibility.

The "lowest" component is the VM Region subsystem. This subsystem presents all VM "metadata" (Cache LU Headers, Direct Linear Map data, and Chunk Repository Chunk Allocation maps, etc.) as a set of 64 KB VM Regions. These VM Regions encompass all assigned Cache LU disk space except for the actual Chunk Data. When a client of the VM Region subsystem requests a Region, that request is mapped to a Cache LU and Offset.

The VM Region subsystem initializes Cache LUs with a Cache LU Header when they are assigned to a Target LU. It calls up to the Cache Repository and Direct Linear Map subsystems to allow them to initialize their Meta Data Maps. After those upcalls, the information in the Cache LU Header belongs exclusively to the VM Region subsystem.

The second component of the system is the Paging subsystem which is a client of the VM Region subsystem, and implements a Read Cache (or Write Through) cache of VM Regions. A VM Region can be read into a 64 KB Page. The Paging maintains a least recently used (LRU) queue of Pages, so that unused Pages can be used to read in new VM Regions.

The client interface is a "Reference, De-Reference" interface. When a client References a VM Region, it may be read into a Page, if there is not already a Page that contains the VM Region. When a client de-references a VM Region, that is an indication that the client is through with the VM Region, and the Page may be eligible for re-use. The actual data on a Page is completely opaque to the Pager.

The third component of the system is the Chunk Repository subsystem which manages the vast bulk of the Cache LU or cache disk as a set of mappable Chunks. When it becomes necessary to make a copy of data (for a COFW copy, or an LU Write copy), the Chunk Repository supplies the appropriate area of the Cache LU. The Chunk Repository Meta Data is largely a Chunk Allocation Map, where each Chunk Allocation Block maintains information about a piece of a Cache LU. The information maintained includes Session information about the Session for which the data was copied, as well as the cache bit that reflects whether or not the Chunk data has been copied.

Chunks are Requisitioned (made allocated and readied for use), Returned (de-allocated), and Scavenged. A set of Chunks is Scavenged, i.e., released en masse, when a Session is stopped, or a Snap LU [Please define] is deactivated.

The fourth component is the Direct Linear Map subsystem which maintains a map from the source LU offset, session, and LU write bit to a mappable chunk. There are two sections of the map, the COFW section, and the Snap LU section. Then COFW section is organized by source LU Chunk number, then by session. This places the map entries for different sessions for the same source LU contiguously in the map. This organization facilitates multiplexing different session onto the same mappable Chunk. The Snap LU section of the map is organized by session, then by source LU. This facilitates releasing all Chunks associated with a particular Snap LU quickly.

When processing Target LU writes, if a COFW becomes necessary, the DLM Requisitions a mappable Chunk from the Chunk Repository. The Chunk ID is entered into the appropriate map entry (or Entries) in the COFW portion of the Map. Then the appropriate data is written to the Cache LU area referenced by the Chunk, and the In Cache Bit is set in the Chunk Allocation Record.

When processing LU reads, the Direct Linear Map is read to determine if there has been a COFW or LU write for the source LU and session. If there has been such a write, then the Snap LU read is deflected to the proper offset on a Cache LU for the data.

When processing an LU write, the DLM Requisitions a Mappable Chunk from the Chunk Repository. The Chunk ID is entered into the appropriate Map Entry (or Entries) in the Snap LU portion of the map. The appropriate data is then written to the Cache LU area referenced by the Chunk, and the in cache bit is set in the Chunk Allocation Record.

As already discussed, the system uses a direct linear mapping from Target LU offset and Session Number to a Chunk on the Cache LU. The system uses a number of direct linear mapping data structures as follows.

Direct Linear Map Section Bitmap

Though it is divided into 64 K VM Regions for purposes of paging and initialization, this is a simple bitmap, not a K10_MISC_UTIL_BITMAP. There is no need for a count of bits (that can be derived from the size of the Source LU), and the code never needs to see if all bits have been set. All inquiries concern themselves with a single bit.

Since there are no dependencies between bits in the Section Bitmap, writing a Section Bit Map introduces no concerns.

Direct Linear Map Section

There are no dependencies between the Map Blocks in a Map Section. The Map Section is a completely arbitrary set of 128 contiguous Map Blocks as follows:

typedef SC_DLM_LINEAR_MAP_BLOCK C_LINEAR_MAP_SECTION[128];

Direct Linear Map Block

Since there is a dependency between Session IDs and Map Entries, the Session Ids associated with a Map Block will be stored in that Map Block. This permits complete writes during Chunk Creation, and is specifically set forth as follows:

```
typedef struct_SC_DLM_LINEAR_MAP_BLOCK
{
    ULONG                SessionIDs
                         [SC_MAX_SESSIONS];
    SC_CHUNK_INDENTIFIER MapEntries [120];
}SC_DLM_LINEAR_MAP_BLOCK,
*PSC_DLM_LINEAR_MAP_BLOCK;
```

Direct Linear Map

The Direct Linear Map will have two sections, the COFW section, and the Snap LU section. The COFW Section will precede the Snap LU Section on disk.

Direct Linear Map COFW Section

Since sessions are multiplexed across COFW Chunks, the COFW section of the Map is laid out so that Map Entries associated with different sessions for the same Source LU Chunk Number will be adjacent (and in the same Map Block) as follows:

Map Index=(Source LU Chunk Number*SC_MAX_SESSIONS)+Session Index

For example, if a Chunk had been allocated for Target LU Chunk 666, with Session 2, then slot 351468 ((Target LU Chunk Number*Max Sessions)+Session Number) will be a Cache Chunk Identifier. The array near that address might look like:

1) Location 351465 (Target LU 665, Session 7)=Cache 3, Chunk 33

2) Location 351466 (Target LU 666, Session 0)=NULL

3) Location 351467 (Target LU 666, Session 1)=Cache 2, Chunk 495

4) Location 351468 (Target LU 666, Session 2)=Cache 3, Chunk 1095

5) Location 351469 (Target LU 666, Session 3)=Cache 3, Chunk 1095

Direct Linear LU Section

Since Snap LU Writes do not share Chunks across sessions, the LU Section of the Map may be laid out with the following algorithm:

Map Index=(Session Index*Chunks in Source LU)+Source LU Chunk Number

The DLM subsystem needs to be able to access Map Entries and the Various Region Maps, given the Source LU Chunk Offset. A Locate function is provided which returns the First Source LU Chunk Identifier on the Cache LU that contains the Map Entry, along with the Location of the DLM Meta Data Region on that Cache LU, and the number of Source LU Chunks whose Map Entries reside on that Cache LU. With this information, the DLM can calculate the VM Region of interest, as illustrated below.

```
1)  Region Number = 0;
2)  While (SC_VM_NO_MORE_LEDGER_ENTRIES != status)
{
Get Table Of Contents (Region Number);
        If ((Source LU Chunk Identifier <Table of Contents ->
        First Source Chunk Identifier) &&
        (Region <= Table of Contents -> Last Source Chunk Identifier))
        {
3)      Map Entry Located = TRUE;
        }
        else
        {
4)      Region Number = Table Of Contents -> Last Region +1;
        }
}
5)  IF (CHUNK_FOUND)
{
    status =
    SC_VM_DLM_SOURCE_LU_CHUNK_OUT_OF_BOUNDS;
}
6)  If (Cache LU Found)
{
    return Table of Contents -> First Source Chunk Identifier,
7)  Table of Contents -> DLM Meta Data Region,
8)  Number of Source LU Chunks
}
```

A Session Mask may also be retrieved. This is done the same as retrieving a Chunk, but inspects all eight "neighbors" in the DLM to build the Bit Map.

A Locate Chunk function searches for a Chunk Record associated with the Source LU Chunk and the Session Mask. If no Chunk Record is found, then it will return SC_VM_DLM_NO_CHUNK_RECORD_FOUND. If no Chunk Record if found, and the Source LU Chunk is higher than the highest Source LU Chunk in the Map, the function will return the following error code: SC_VM_DLM_SOURCE_LU_CHUNK_OUT_OF_BOUNDS.

A Map Chunk function allocates a Chunk Record (thereby allocating a Chunk), and enters the Chunk ID in the DLM.

A Un-Map Chunk function clears a Map Entry (or set of Map Entries), and frees a Chunk if there are no longer any Map Entries that reference the Chunk.

A Retrieve Session Mask function sets a Bit Mask representing Sessions for which COFW Chunks have been allocated for this Source LU Chunk.

The system driver uses a set of Cache LUs to create the "point in time view" of a particular Target LU. This set supplies persistent storage for Direct Linear Map Entries, Cache LU Mappable Chunk Allocation Map Entries, and Cache LU Mappable Chunks. A virtual map, VM Region Set subsystem manipulates all of the VM Data as a set of VM Regions. This data includes the Direct Linear Map associated with a Target LU and Chunk Allocation Maps associated with Cache LUs assigned to that Target LU.

A VM Region includes a number of set data structures. Each Target LU has a ledger, which stores information about Cache LU'S assigned to that Target. Some of this information is inter-Cache LU, for example, the order of the Cache LUs, or translation from VM Region to Cache LU and offset on LU. Some of the information is intra-Cache LU (which meta data areas have and have not been initialized).

A Lock data structure is used to mediate access to the Ledger;

A Source LU Size in Chunks data structure provides the source LU size in Chunks, which is used for sizing the DLM. It could be recalculated whenever it is needed, but it can also be calculated once and stored in this data structure.

A Catalogue data structure is a list of Copy VM Ledger Entries, sorted by VM Region Identifier.

A DLM State data structure provides the state of initialization of the Direct Linear Map (No Map, Incomplete Map, etc);

A Ledger Entry data structure describes the VM Regions on a particular Cache LU. The ledger entries are sorted in the Ledger for quick discovery of the Cache LU that contains a specific VM Region. A Ledger Entry is a simplified ephemeral copy of a Cache LU header. It is used, for example, when the Cache Repository is asked to set the In Cache bit for a Chunk.

A Table of Contents provides information about the location of various Bitmaps on the Cache LU.

A PCache is a pointer to the PSC_CACHE_LIST_ENTRY associated with this Cache LU.

A Cache LU Header data structure is used with each Cache LU. This information is persistent, as follows:

```
typedef struct_SC_VM_CACHE_LU_HEADER
{
    ULONG                           Version;
    SC_VM_CACHE_TABLE_OF_CONTENTS   Table Of Contents;
    K10_MISC_UTIL_BLOCK_BITMAP      DLM Meta Data Initialized Bit Map;
```

| | |
|---|---|
| K10_MISC_UTIL_BLOCK_BITMAP | Cache Repository Meta Data Initialized Bit Map; |
| } SC_VM_CACHE_LU_HEADER, *PSC_VM_CACHE_LU_HEADER; | |

A Version data structure identifies which version of the map initializes the Cache LU.

The Table of Contents data structure provides information about the location of various Bitmaps on the Cache LU.

A Meta Data Initialization Bit Maps are used when a Cache LU disk is assigned to a Target LU. When this occurs, the Cache LU disk often needs to be "initialized" for the specific task that required its assignment. For example, the first Cache LU assigned to a Target LU must be initialized to contain the Direct Linear Map (or some portion of the Map) for that Target LU. Subsequent Cache LUs may contain some part of the DLM, or a Mappable Chunk Repository, or both.

Assignment of Cache LUs need not initialize an entire DLM or Cache Repository. If the assignment persistently stores information about initialized and un-initialized 64 K Regions of the disk, then the DLM and Mappable Chunk Repository Subsystems can initialize regions as necessary.

Ideally, the assignment of a Cache LU should require writing only one 64 K Region to that disk. This 64 K write should include the initialized/un-initialized Bit Map, as well as other information about the assignment. It is clear that the DLM Map Regions Bitmaps will not fit in the 64 K region. However, the DLM could use a "meta meta" approach, where each Bit in the VM Region Set's initializes/un-initialized Bit Map reflected the state of a 64 K Region of a VM Region Bit Map, then very large Source LUs could be accommodated.

Consider a 1 PB Source LU, with a Mappable Chunk Size of 16 K. This will require 2 TB (terrabyte) of DLM Map Data:

1) 1 PB/16 K Mappable Chunk Size*8 Sessions=512 G Map Entries 2) 512 G Map Entries*4 Bytes Map Entry=2 TB Map The 2 TB Map is contained in 32 M 64 K Map Regions:

3) 2 TB/64 KB=32 M Map Regions

A Map Region Bitmap (1 Bit per region) will take 4 MB of disk space 4) 32 M Map Region Bits/8 Bits per Byte=4 MB This 4 MB Bit Map can be contained in 64 VM Regions 5) 4 MB/64 K=64 Mega Data Bits Those 64 Bits can be represented in 8 Bytes of VM Region Set Meta Data.

Even allowing for multiple Region Bit Maps, a 4 K Meta Data Region for the VM Region Set Meta Data should be sufficient.

The VM Region Set Mappable Chunk Repository is more compact, due largely to the small size of the Repository Map. The largest permissible Cache LU contains $2^{32}$ Mappable Chunks. Information about 320 Mappable Chunks fit in each 512 Byte Mappable Chunk Allocation Block. The largest possible Cache LU can be represented by approximately 12 M Mappable Chunk Allocation Blocks, as follows:

4 G Mappable Chunks/320 Mappable Chunks per Cache Allocation Block 12.8 M Cache Allocation Blocks which will fit in 6.4 GB of Disk Space:

12.8 M Cache Allocation Blocks*512 bytes=6.4 GB of Cache Allocation Blocks

6 GB of Cache Allocation Blocks will consume 96 K VM Regions, so the Region Bitmap will take about 12 K of Disk Space:

6.4 GB/64 K per Region=102.4 K Regions 102.4 K Regions/8 Bits per Byte=12.8 KB Bit Map per Cache Allocation Block Region This Bit Map is small enough to be included directly in the Cache Header. That is, with one less level of indirection than the DLM Region Bit Maps. In fact, several Cache Allocation Block Region Bit Maps may be stored in the Cache Header.

A Cache LU Table of Contents is a table of locations of VM Data on the Cache LU. This is a small data structure used for fast lookups. For example, calculating the disk offset of a Mappable Chunk:

1) Chunk Position=Chunk Identifier−(Table Of Contents−>First Chunk Identifier);

2) Chunk Offset=((First Mappable Chunk Region−First Region Identifier)* VM Region Size)+

(Chunk Position*Chunk Size)

All region specifications in this structure are "absolute", that is relative to the Target LU, not relative to the Cache LU, and are discussed as follows:

```
typedef struct SC_VM_CACHE_LU_TABLE_OF_CONTENTS
{
    ULONG    First Region;
    ULONG    Last Region;
    ULONG    First Source Chunk Identifier;
    ULONG    Last Source Chunk Identifier;
    ULONG    First Mappable Chunk Identifier;
    ULONG    Last Mappable Chunk Identifier;
    ULONG    DLM Meta Data Region;
    ULONG    Mappable Chunk Repository Meta Data Region;
}
```

A VM Region Set, including First Region and Last Region, views the set of Cache LUs assigned to the Target LU as one large array of 64 K Data Regions. These Regions can contain any non-COFW Data, i.e. the DLM, the Cache Header, and the Cache Allocation Blocks. The areas of Cache LUs used for COFW Data are not included in this set of Data Regions. The VM Region Set system never reads from or writes to the COFW Data areas, it only stores Chunk offsets into those data areas, and information about those data areas.

The fact that the set of 64 K Data Regions is non-contiguous on disk is masked by the VM Region Set. In other words, Region 666 may be the $67^{th}$ Region on Cache LU 1, while Region 667 is the $1^{st}$ Region on Cache LU 7.

As the Cache LUs are assigned or read in from Cache LUs, the VM Region Set subsystem will build a map of the Regions backed up by each Cache LU.

The VM Region Set views DLM as a very large array of Map Entries associated with Source LU Chunks. The First Source Chunk Identifier and Last Source Chunk Identifier fields identify which Source LU Chunks have Map Entries on this Cache LU.

The VM Region Set views Cache Repository as a very large array of Mappable Chunks. The First Mappable Chunk Identifier and Last Mappable Chunk fields identify which Mappable Chunks are mapped by this Cache LU.

The DLM and Cache Repository fields contain information about the first Meta Data Region for each. This is used, with the Initialization Bit Maps to determine which of those Regions have and have not been identified. Meta Data Offsets are Region Identifiers.

A VM Region I/O is asynchronous. Thus, in VM Region I/O Completion Callback any caller of a VM Region I/O function (Read, Write) must supply a callback function. The VM Region I/O completion callback function will call that function with the supplied contexts to the status of the IO.

The VM Region includes a number of Algorithms.

A VM Region Read is a simple disk read, with the exception that if the VM Region being Read is a Meta Data Region, and has not been initialized, then the Read will return a Zeroed out Region, and a status code indicating that the Region has not been initialized.

A Region Write sets the proper bits in the Cache header if the Write is to a previously un-initialized Meta Data area.

The Mappable Chunk Repository subsystem needs to be able to access the Chunk Allocation Region given the Mappable Chunk Identifier. The Locate Mappable Chunk function returns the First Mappable Chunk Identifier on the Cache LU that contains the Map Entry, along with the Location of the Mappable Chunk Meta Data Region on that Cache LU, and the number of Mappable Chunks whose Map Entries reside on that Cache LU. With this information, the Chunk Repository can calculate the VM Region of interest.

When the VM Region subsystem is asked to add a cache LU, the Add Cache LU function first verifies that the entire DLM has been written. If not, then part (or all) of the disk is allocated for DLM Data. Any remaining Cache LU space is allocated for Chunk Repository Data;

The system also includes a number of VM Region Set Interfaces as follows.

The Region Load routine is called by the paging subsystem on a cache miss. The paging subsystem will request a read only when the necessary region is not resident in volatile memory.

The caller assumes allocation responsibility for the region.

The caller should not perform any destructive action on the target device extension or the region itself until the callback routine for this request has executed.

A Cache Set subsystem assumes that for any region there will only be one cache operation outstanding. There will never be two or more cache misses executing for the same region. Likewise there will never be a cache miss and cache flush operation executing at the same time for the same region.

The Region Write routine is called by the Direct Linear Mapping subsystem on a cache flush.

This routine does not return an error. The status of the disk write operation will be reported in the cache flush callback routine.

The caller assumes allocation responsibility for the region.

The caller should not perform any destructive action on the target device extension or the region itself until the callback routine for this request has executed.

A Cache Set subsystem assumes that for any region there will only be one cache operation outstanding. There will never be two or more cache flushes executing for the same region. Likewise there will never be a cache miss and cache flush operation executing at the same time for the same region.

A Get Table of Contents function looks up the Ledger Entry associated with a particular Region, and returns the Table of Contents and Cache Device associated with the Region. This allows the Direct Linear Map and Chunk Repository subsystems to walk the Cache LUs looking for information.

A Paging subsystem is also provided.

Since DLM's can be very large, and need only be resident in memory for short periods of time. It is expected that most I/O access to Target LUs exploit locality of disk locations.

The Paging subsystem root data structure is used to maintain the list of pages and the supporting types for the paging algorithm. The root data structure also contains various statistics that may or may not be customer visible, but will help during triage. This structure may also contain debugging code that has the ability to shrink the working set.

The Paging subsystem also includes a page entry data structure which contains the paging subsystem meta-data for a region. This structure links into the global linear hash table. Individual page properties such as a reference count and work order queues are maintained in this structure. The page entry subdata structure also contains various statistics that may or may not be customer visible, but will help during triage.

The paging subsystem is unaware of the type of the region to maintain modularity. The paging subsystem is only responsible for the paging operation, and does not care to inspect the contents of the page itself.

There is also a page cache data structure which is a temporary structure used to maintain state information during a cache miss operation. Since the cache miss interface is asynchronous, the Paging subsystem is required to maintain the state of each transaction for the caller. There can be multiple cache miss operations occurring at the same time.

The Interface includes various routines.

The Initialize routine is executed during driver initialization. Since the paging subsystem uses a static global variable, there are no error conditions that can be encountered during initialization.

The De-initialize routine is executed during shutdown. When this routine is called all regions that are on the LRU list are released.

It is considered a fatal error to execute this routine while there are references being held for regions.

Before a region can be accessed, a reference must be granted. Obtaining a reference first involves retrieving the region (if necessary) from disk. The reference ensures that the region remains valid for the duration of the operation. Each successful reference operation must be paired with a de-reference operation.

To reference a region, the caller must specify a region number as well as a pointer to a target device extension. Success is returned if the region is already in volatile memory. The caller can then access the region through the pointer returned.

If the region is not in volatile memory a disk operation must occur. A return code indicating the operation is pending will be returned. Due to disk latency this will occur asynchronously with a caller supplied context to identify the transaction.

Multiple references can be held at the same time for a single region. Also, multiple references can be requested at the same time. Each reference request is considered a separate transaction.

The Reference Callback provides that if the paging subsystem indicated an asynchronous cache miss operation, the page available routine will inform the caller when the reference has been successfully obtained.

For every reference request that had a return code indicating a pending operation, this routine will be executed.

The De-reference provides that once a caller has finished accessing a region it must explicitly release the reference held. This will allow the paging subsystem to maintain a list of candidate regions to release back to disk.

As regions are referenced and de-referenced some will have to be removed from volatile memory. When all available memory is consumed with regions, some regions will have to be freed up for the new requests. For efficiency and to encourage temporal and spatial locality, an intelligent algorithm must be used.

A simple and efficient approach is to employ a "least recently used", or LRU, algorithm. When a region has no references it is placed on the tail of a doubly linked list, the LRU list. The optimistic view is that if this region was requested once then there is a good chance that it will be requested again. If this region is requested it is simply removed from the LRU list and presented to the caller.

To intelligently select a region to remove from volatile memory we have the "least recently used" region. By removing the head of the LRU list it can be safely assumed that the "least recently used" region has been removed.

Access to the LRU list is always constant. There is never a reason to traverse the list. Therefore, access to the list is not a performance concern. The LRU list a global resource to ensure that all Snap devices are treated fairly.

The system uses a Repository of Mappable Chunks to store Chunk Data for the "point in time view of data" that may eventually be read by the User. The Chunk Repository is responsible for maintaining that Repository.

The Chunk Repository controls the use of Mappable Chunks in the Disk Cache. The Chunk Repository consists of collection of Chunk Allocation Blocks, each of which stores information about 320 Mappable Chunks.

The Chunk Allocation stores information about Mappable Chunks that have been allocated in a Chunk Repository on a Cache LU Disk. Each Chunk Allocation Block stores information about 320 Mappable Chunks. The Chunk Allocation Blocks are 512 Byte.

Session Sequence Numbers

The Cache Allocation Block Session Sequence Numbers are used in conjunction with Session Masks during Session stops to free Mappable Chunks that were in use for the stopping Session. When a Cache Mappable Chunk is allocated for a Session on a Target LU, the Sessions IDs associated with Sessions for which the Mappable Chunk is being allocated will be stored in this array.

If a search for space encounters a Session Sequence Number from a moribund Session, the Session can be "stopped" for that Chunk Allocation Block by turning off Bits in all Session Masks in the Block, perhaps freeing Mappable Chunks.

The number of un-allocated Chunk Records in this block is known as Chunks Free. If this field is 0, then the Chunk Allocation routines can skip the Block If a Mappable Chunk has been allocated for a COFW, the appropriate bit in the Allocation Bit Map will be set.

If a Mappable Chunk has been written to disk then the appropriate bit in the In Cache Bit Map will be set.

When a Mappable Chunk is allocated, the Target LU's current Session Mask is copied to the Mappable Chunk's Session Mask. These masks allow the system to multiplex concurrent Sessions onto Mappable Chunks.

The Chunk Allocation Block Initialization Bit Map is stored in the Cache Header, but it is manipulated by the Chunk Allocation routines. When a Cache LU is assigned to a Target LU, this Bit Map is cleared. When a 64 K Chunk Allocation Region is used, the appropriate Bit is set.

The Chunk Allocation Block Full/Empty Bit is Stored in the Cache Header, but it is manipulated by the Chunk Allocation routines. This Bit Map is use to accelerate searches for unused Mappable Chunks. When an Allocation routine detects that it has used the last free Chunk in a Chunk Allocation Block Region, it will set this Bit. Subsequent searches will skip that Region until the Bit is cleared.

There is also a Chunk Identifier to Cache LU Offset algorithm which maps a Mappable Chunk Identifier to a Cache device and offset, so that the driver can read or write the Mappable Chunk.

The Interface includes a number of functions as follows.

The Requisition Chunk function allocates a Chunk (perhaps cleaning up Chunks allocated for moribund Sessions), writes out the Chunk Allocation record, and returns the Chunk ID.

The Return Chunk function clears the appropriate Bit in the Chunk Allocation Record.

The Get In Cache bit function sets the cache bit to TRUE if the Chunk's in cache bit is set, and FALSE if not set.

The Set in Cache Bit function sets the in cache bit for a Chunk.

The Clear In Cache Bit function clears the in cache bit for a Chunk.

The Scavenge Chunks function walks the set of Cache LUs assigned to a Target LU, calling Scavenge Block for each Chunk Allocation Region Block on the Cache LU).

In order to achieve optimal stop and deactivate times a sequence number system is employed. In general, the sequence number will be assigned during session creation or activation. The sequence number is associated with Chunks as necessary. Once the session is stopped or deactivated, the sequence number will expire. The next time that a Chunk is referenced that is associated with the expired sequence number it can be lazily cleaned up.

The session sequence number is assigned to a session during session creation. As already noted, the sequence number is a unique identifier for a session on the array. As I/Os are processed, the session sequence number is stored in the chunk allocation block when the allocation block contains a chunk that is mapped for a particular session.

As the chunk allocation block is searched, the system can determine that the chunk allocation block contains information about a terminated session by observing that the session sequence number has expired. At that time the chunk allocation block can be cleansed of the previous session. The cleansing process consists of clearing the bits in the various bitmaps in the chunk allocation block.

The cleansing operation will succeed across reboots of the storage processor (SP) since all of the information is stored persistently. By cleansing the individual chunk allocation blocks when they are next accessed, the time required to stop the session becomes minimal.

The activation sequence number is associated with a target device when one of the sessions associated with that device is activated. The activation sequence number is stored in the DLM block. It is maintained in a similar fashion to the session sequence number.

It is interesting to note that maintaining a separate field for the activation sequence number in the DLM block is not required. The activation sequence number will be stored in the same slot as the session sequence number.

The system must maintain a counter to determine the next available sequence number. The counter must be stored persistently. The counter must also be distributed across the array.

Having thus generally described the invention, the same will become better understood from the appended claims, in which it is set forth in a non-limiting manner.

he invention claimed is:

1. A method of creating point-in-time view of data on a disk, comprising:
    initiating from a host, a first session of writing data to a disk which affects a portion of the disk;
    creating and storing entries in an array on the disk which identifies where the data written to the disk during said first session is located;
    initiating at least one second session of writing data to a disk at a time different from the initiation of the first session, with said at least one second session of writing data affecting a portion of the disk;
    copying data in any portion of the disk corresponding to said first session which is to be affected by a write operation by said at least one second session;
    creating and storing entries in said array which identify where data corresponding to said first session which is to be affected by a write operation by said at least one second session is located;
    invalidating said entries in said array for said at least one of said first and said second session when at least one of a new first session and a new second session is initiated; and
    wherein said first session and said at least one session are initiated and controlled by a first host, and point-in-time viewing of the data on the disk is conducted by a second host.

2. The method of claim 1, wherein a session sequence number is assigned to a session when a session is initiated, and said sequence number is stored in said array.

3. The method of claim 2, wherein as input and output operations are processed, the session sequence number is stored in a chunk allocation block.

4. The method of claim 1, wherein said data affected by said at least one second session write operation is copied from a source disk to be stored at a cache disk.

5. The method of claim 1, wherein sessions are assigned specific slots in the array, and wherein when a new session is to replace a corresponding prior session, it is assigned to the same slot in the array as the prior session.

6. The method of claim 5, wherein said sessions are assigned session ID's, and wherein the session ID of a prior invalidated session is different from the session ID of a later corresponding session assigned to its same slot in the array.

7. The method of claim 1, wherein said array comprises a direct linear map pointing to sections of the disk where data is located for each session.

8. The method of claim 7, wherein said direct linear map comprises a Map Region subsystem, a Paging subsystem, a Chunk Repository subsystem and a Direct Linear Map subsystem.

9. The method of claim 1, wherein each session is assigned a unique session ID.

10. A method of allowing point-in-time view of data on a disk, for data written to a disk throughout a plurality of different sessions, comprising;
    creating an array on a disk comprised of a map which is a linear map which stores entries and points to locations which are sections of the disk where data is located for each session, said linear map comprising a Map Region subsystem, a Paging subsystem, a Chunk Repository subsystem and a Direct Linear Map subsystem;
    assigning predetermined slots for corresponding sessions in said array; and
    assigning a unique session ID for each session for which entries are stored as said array.

11. The method of claim 10, further comprising invalidating a session by assigning a new session corresponding thereto to the invalidated session's slot in the array, and assigning the new session an ID different from that of the invalidated session.

12. The method of claim 10, wherein said array comprises a direct linear map pointing to sections of the disk where data is located for each session.

13. The method of claim 10, wherein said VM region subsystem presents all VM metadata as a set of 64 KB VM regions.

14. The method of claim 10, wherein said paging subsystem maintains a least recently used number of pages so that unused pages can be used to read in new VM regions.

15. The method of claim 10, wherein the Chunk Repository subsystem manages the cache disk as a set of mappable Chunks.

16. The method of claim 10, wherein the Direct Linear Map subsystem maintains a map from the source LU offset, session and LU write bit to a mappable Chunk.

17. The method of claim 10, wherein data writing for sessions is initiated and controlled by a first host, and point-in-time viewing of data on the disk is conducted by a second host.

* * * * *